United States Patent
Liu et al.

(10) Patent No.: US 10,498,508 B2
(45) Date of Patent: *Dec. 3, 2019

(54) DEVICE, NETWORK, AND METHOD FOR COMMUNICATIONS WITH FAST ADAPTIVE TRANSMISSION AND RECEPTION

(71) Applicant: Futurewei Technologies, Inc., Plano, TX (US)

(72) Inventors: Jialing Liu, Palatine, IL (US); Weimin Xiao, Hoffman Estates, IL (US); Qian Cheng, Naperville, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,079

(22) Filed: Mar. 26, 2018

(65) Prior Publication Data

US 2018/0219661 A1    Aug. 2, 2018

Related U.S. Application Data

(63) Continuation of application No. 14/819,294, filed on Aug. 5, 2015, now Pat. No. 9,929,839.

(Continued)

(51) Int. Cl.
*H04W 4/00* (2018.01)
*H04L 5/00* (2006.01)
(Continued)

(52) U.S. Cl.
CPC ............ *H04L 5/0048* (2013.01); *H04L 5/001* (2013.01); *H04W 56/0015* (2013.01);
(Continued)

(58) Field of Classification Search
CPC ............ H04L 5/0048; H04W 56/0015; H04W 72/042; H04W 72/0446; H04W 28/08; H04W 74/0808

See application file for complete search history.

(56) References Cited

U.S. PATENT DOCUMENTS 9,929,839 B2 *   3/2018   Liu ...................... H04L 5/0048
2009/0004971 A1   1/2009   Dateki et al.
(Continued)

FOREIGN PATENT DOCUMENTS

CN   102761911 A   10/2012
EP   2819313 A1   12/2014
(Continued)

OTHER PUBLICATIONS

Huawei (3GPP TSG RAN WG1 Meeting #77, R1-141918, New L1 procedure for small cell on/off transition time further reduction) (Year: 2014).*

(Continued)

*Primary Examiner* — Maharishi V Khirodhar
(74) *Attorney, Agent, or Firm* — Slater Matsil, LLP

(57) ABSTRACT

An embodiment of the present invention is disclosed including a method for adaptive reception, the method. The method includes receiving, by a user equipment (UE), an indicator from a first component carrier, the indicator indicating whether a second component carrier is in the On state. Receiving, by the UE, from the second component carrier a subframe wherein a reference signal is provided at a first symbol position of the subframe in a majority of subcarriers of the subframe. The second component carrier and the UE are then synchronized based on the reference signals. The UE then initiates a data link with the second component carrier.

33 Claims, 19 Drawing Sheets

Related U.S. Application Data

(60) Provisional application No. 62/035,300, filed on Aug. 8, 2014, provisional application No. 62/038,754, filed on Aug. 18, 2014.

(51) Int. Cl.
  *H04W 56/00* (2009.01)
  *H04W 72/04* (2009.01)
  *H04W 28/08* (2009.01)
  *H04W 74/08* (2009.01)

(52) U.S. Cl.
  CPC ..... *H04W 72/042* (2013.01); *H04W 72/0446* (2013.01); *H04W 28/08* (2013.01); *H04W 74/0808* (2013.01)

(56) References Cited

U.S. PATENT DOCUMENTS

| | | | |
|---|---|---|---|
| 2009/0042532 | A1 | 2/2009 | Bienas et al. |
| 2011/0268087 | A1 | 11/2011 | Kwon et al. |
| 2012/0044818 | A1 | 2/2012 | Lindoff et al. |
| 2012/0140743 | A1* | 6/2012 | Pelletier ............ H04W 72/0453 370/335 |
| 2012/0163335 | A1 | 6/2012 | Chung et al. |
| 2012/0207126 | A1 | 8/2012 | Qu et al. |
| 2012/0230271 | A1 | 9/2012 | Kim et al. |
| 2013/0028134 | A1 | 1/2013 | Wang et al. |
| 2013/0070693 | A1 | 3/2013 | Kwon et al. |
| 2013/0265945 | A1 | 10/2013 | He et al. |
| 2014/0003385 | A1 | 1/2014 | Dinan |
| 2015/0003356 | A1 | 1/2015 | Seo et al. |
| 2015/0071200 | A1 | 3/2015 | Takeda et al. |
| 2015/0208372 | A1 | 7/2015 | You et al. |
| 2015/0271814 | A1* | 9/2015 | Park ........................ H04B 7/04 370/329 |
| 2015/0341949 | A1* | 11/2015 | Nagata .................. H04L 5/0098 370/329 |
| 2016/0007269 | A1 | 1/2016 | Chae et al. |
| 2016/0072712 | A1 | 3/2016 | Gao et al. |

FOREIGN PATENT DOCUMENTS

| | | |
|---|---|---|
| EP | 2836034 A1 | 2/2015 |
| JP | 20120062745 | 3/2012 |
| WO | 2013041757 A1 | 3/2013 |
| WO | 2013109036 A1 | 7/2013 |
| WO | 2013125917 A1 | 8/2013 |
| WO | 2013151127 A1 | 10/2013 |
| WO | 2014007573 A1 | 1/2014 |

OTHER PUBLICATIONS

Huawei, et al., "New L1 procedure for small cell on/off transition time further reduction," 3GPP TSG RAN WG1 Meeting #77, R1-41918, Seoul, Korea, May 19-23, 2014, 6 pages.

International Search Report for Application No. PCT/CN2015/086387, dated Nov. 10, 2015, 11 pages.

Huawei, HiSilicon; "Discontinuous Transmission and Partial Subframe Design for LAA," 3GPP TSG RAN WG1 Meeting #81, R1-152471, Fukuoka, Japan, May 25-29, 2015, 5 pages.

Huawei, HiSilicon, "Transmission Schemes and CSI Support for LAA," 3GPP TSG RAN WG1 81, Meeting, R1-152473, Fukuoka, Japan, May 25-29, 2015, 4 pages.

Huawei, HiSilicon, "Support for UE Synchronization on a LAA Scell," 3GPP TSG RAN WG1 81, Meeting, R1-152474, Fukuoka, Japan, May 25-29, 2015, 4 pages.

Huawei, HiSilicon; "LAA Synchronization and Indication of Downlink Transmission," 3GPP TSG RAN WG1 Meeting #81, R1-153199, Fukuoka, Japan, May 25-29, 2015,4 pages.

Huawei, HiSilicon, "Subframe Structure for LAA Downlink," 3GPP TSG RAN WG1 81, Meeting, R1-153201, Fukuoka, Japan, May 25-29, 2015, 5 pages.

Ericsson,"Comparison between different New L1 Procedures," 3GPP TSG RAN WG1 Meeting #77, R1-142381, Seoul, South Korea, May 19-23, 2014, 9 pages.

Ericsson, "Summary of proposed schemes for small cells on/off transition time reduction," 3GPP TSG RAN WG1 Meeting #77, R1-142779, Seoul, South Korea, May 19-23, 2014, 7 pages.

3GPP TS 36.211 V12.2.0 (Jun. 2014), "3rd Generation Partnership Project; Technical Specification Group Radio Access Network; Evolved Universal Terrestrial Radio Access (E-UTRA); Physical channels and modulation (Release 12)," Jun. 2014, 121 pages.

ZTE, "Procedures for small cell on/off transition time reduction," 3GPP TSG RAN WG1 Meeting #77, R1-142239, Seoul, Korea, May 19-23, 2014, 7 pages.

MediaTek Inc., "Discovery signal designs for small cell discovery enhancements," 3GPP TSG-RAN WG1 #77, R1-142300, Seoul, Korea, May 19-23, 2014, 6 pages.

* cited by examiner

DEVICE, NETWORK, AND METHOD FOR COMMUNICATIONS WITH FAST ADAPTIVE TRANSMISSION AND RECEPTION

CROSS-REFERENCE TO RELATED APPLICATIONS

This application is a continuation of U.S. patent application Ser. No. 14/819,294, filed on Aug. 5, 2015, entitled "Device, Network, and Method for Communications with Fast Adaptive Transmission and Reception," now U.S. Pat. No. 9,929,839, issued on Mar. 27, 2018,which claims the benefit of U.S. Provisional Application No. 62/035,300, filed on Aug. 8, 2014, entitled "Device, Network, and Method for Communications with Fast Adaptive Transmission and Reception," and U.S. Provisional Application No. 62/038,754, filed on Aug. 18, 2014, entitled "Device, Network, and Method for Communications with Enhanced Reference Signals," which applications are hereby incorporated herein by reference.

TECHNICAL FIELD

The present disclosure relates to a device, network, and method for wireless communications, and, in particular embodiments, to a device, network, and method for communications with fast adaptive transmission and reception.

BACKGROUND

The amount of wireless data being transferred is expected to exceed that of wired data, pushing the limits of macro cellular deployment. Small cell deployment with higher density and/or with new and diversified spectrum resources may be used to help handle this increase in data capacity, while meeting customer quality of service expectations and operators' requirements for cost-effective service delivery.

Small cells generally are low-power wireless access points that operate in a licensed spectrum. Small cells provide improved cellular coverage, capacity and applications for homes and businesses, as well as metropolitan and rural public spaces. Different types of small cells include, generally from smallest size to largest size, femtocells, picocells, and microcells. Small cells may be densely deployed and may also utilize additional spectrum resources, such as unlicensed spectrum resources.

SUMMARY OF THE INVENTION

An embodiment of the present invention is disclosed including a method for adaptive reception, the method. The method includes receiving, by a user equipment (UE), an indicator from a first component carrier, the indicator indicating whether a second component carrier is in the On state. Receiving, by the UE, from the second component carrier a subframe wherein a reference signal is provided at a first symbol position of the subframe in a majority of subcarriers of the subframe. The second component carrier and the UE are then synchronized based on the reference signals. The UE then initiates a data link with the second component carrier.

In another embodiment of the present invention, a method is provided for adaptive reception. A first component carrier transmits to a user equipment (UE), an indicator that a second component carrier is in the On state. The second component carrier transmits to the user equipment a subframe a reference signal at a first symbol position of the subframe in a majority of subcarriers of the subframe. The second component carrier and the UE based are then synchronized based on the reference signals and a data transmission from the second component carrier is sent to the UE.

Another embodiment of the present invention includes a user equipment (UE). The UE includes a processor and a computer readable storage medium storing programming for execution by the processor. The programming includes instructions to receive an indicator from a first component carrier, the indicator indicates a second component carrier is in the On state. The UE receives from the second component carrier a subframe wherein a reference signal is provided at a first symbol position of the subframe in a majority of subcarriers of the subframe. The second component carrier and the UE are synchronized based on the reference signals and the UE initiates a data link with the second component carrier.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

Typically, in a modern wireless communications system, such as a Third Generation Partnership Project (3GPP) Long Term Evolution (LTE) compliant communications system, a plurality of cells or evolved NodeBs (eNBs) (also commonly referred to as NodeBs, base stations (BSs), base terminal stations, communications controllers, network controllers, controllers, access points (APs), and so on) may be arranged into a cluster of cells, with each cell having multiple transmit antennas. Additionally, each cell or eNB may serve a number of users (also commonly referred to as User Equipments (UEs), wireless devices, mobile stations, users, subscribers, terminals, and so forth) based on a priority metric, such as fairness, proportional fairness, round robin, and the like, over a period of time. It is noted that the terms cell, transmission points, and eNB may be used interchangeably. Distinction between cells, transmission points, and eNBs will be made where needed.

Figure 1A:
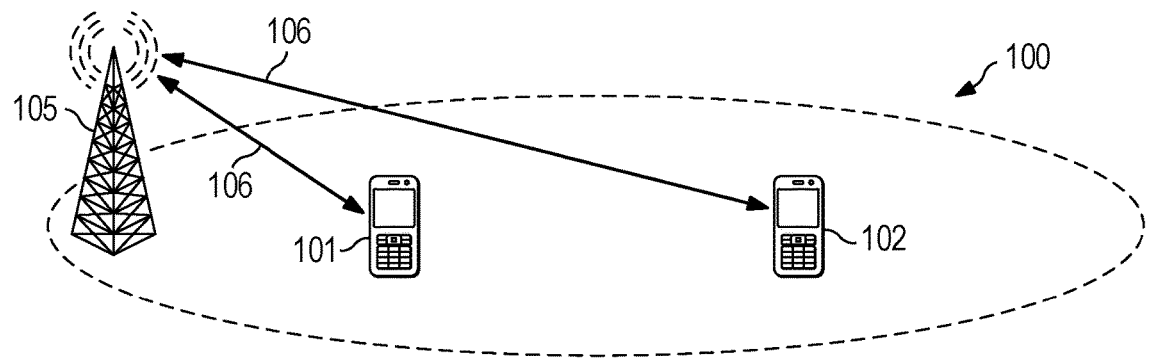
FIGS. 1A-1E show several wireless network configurations.

FIGS. 1A-1E show several wireless network configurations. As shown in FIG. 1A, system 100 is a typical wireless network with a communications controller 105 communicating using a wireless link 106 to a first wireless device 101 and a second wireless device 102. The wireless link 106 can comprise a single carrier frequency such as used typically for a time division duplex (TDD) configuration or a pair of carrier frequencies as used in a frequency division duplex (FDD) configuration. Not shown in system 100 are some of the network elements used to support the communications controller 105 such as a backhaul, management entities, etc. The transmission/reception from controller to a UE is called downlink (DL) transmission/reception, and the transmission/reception from a UE to a controller is called uplink (UL) transmission/reception.

Figure 1B:
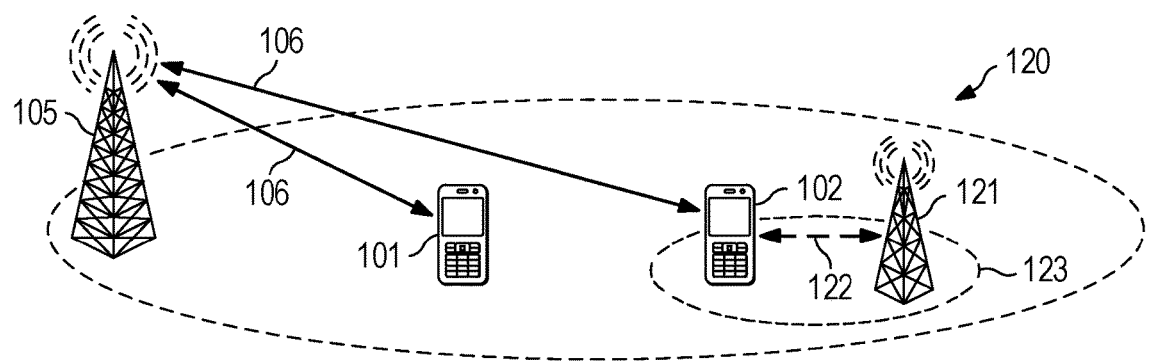

As shown in FIG. 1B, system 120 is an example wireless heterogeneous network (HetNet) with communications controller 105 communicating to wireless device 101 using wireless link 106 (solid line) and to wireless device 102 using wireless link 106. A second communications controller 121, such as a picocell, has a coverage area 123 and is capable of communicating to wireless device 102 using wireless link 122. Typically, wireless link 122 and wireless link 106 use the same carrier frequency, but wireless link 122 and wireless link 106 can use different frequencies. There may be a backhaul (not shown) connecting communications controller 105 and communications controller 121. A HetNet may include a macrocell and a picocell, or generally a higher power node/antenna with a larger coverage and lower power node/antennas with a smaller coverage. Lower power nodes (or lower power points, picos, femtos, micros, relay nodes, remote radio heads (RRHs), remote radio units, distributed antennas, etc.) generally are low-power wireless access points that operate in a licensed spectrum. Small cells may use lower power nodes. Lower power nodes provide improved cellular coverage, capacity and applications for homes and businesses, as well as metropolitan and rural public spaces.

In a realistic network such as system 120 in FIG. 1B, there may be multiple macro points 105 and multiple pico points 121 operating with multiple component carriers, and the backhaul between any two points can be fast backhaul or slow backhaul depending on the deployment. When two points have fast backhaul, the fast backhaul may be fully utilized, e.g., to simplify the communication method and system or to improve coordination. In a realistic network, the points configured for a UE for transmission or reception may include multiple points, some pairs of points may have fast backhaul, but some other pairs of points may have slow backhaul or lack any backhaul.

In a realistic deployment, an eNB may control one or more cells. Multiple remote radio units may be connected to the same base band unit of the eNB by fiber cable, and the latency between base band unit and remote radio unit is quite small. Therefore, the same base band unit can process the coordinated transmission/reception of multiple cells. For example, the eNB may coordinate the transmissions of multiple cells to a UE, which is called coordinated multiple point (CoMP) transmission. The eNB may also coordinate the reception of multiple cells from a UE, which is called CoMP reception. In this case, the backhaul link between these cells with the same eNB is fast backhaul and the scheduling of data transmitted in different cells for the UE can be easily coordinated in the same eNB.

As an extension of the HetNet deployment, densely arrayed small cells using low power nodes may be deployed. This is considered a promising configuration to cope with the mobile traffic explosion, especially for hotspot deployments in indoor and outdoor scenarios. A low-power node generally means a node whose transmission power is lower than macro node and BS classes, for example Pico and Femto nodes. Small cell enhancements for E-UTRA and E-UTRAN, which is an ongoing study in 3GPP, will focus on additional functionalities for enhanced performance in hotspot areas for indoor and outdoor applications using possibly densely deployed low power nodes.

Figure 1C:
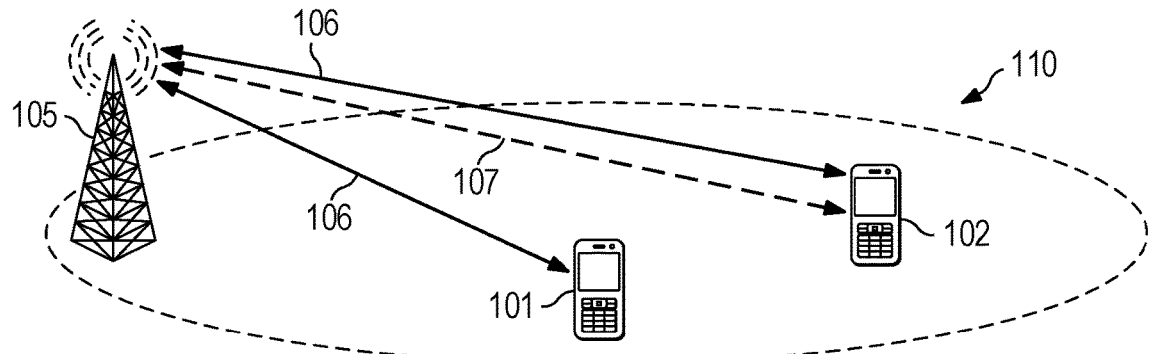

FIG. 1C illustrates the use of carrier aggregation (CA), which is another deployment strategy. As shown in FIG. 1C, system 110 is a typical wireless network configured with carrier aggregation (CA) where communications controller 105 communicates to wireless device 101 using wireless link 106 (solid line) and to wireless device 102 using wireless link 107 (dashed line) and using wireless link 106. In some example deployments, for wireless device 102, wireless link 106 can be called a primary component carrier (PCC) while wireless link 107 can be called a secondary component carrier (SCC). In some carrier aggregation deployments, the PCC can carry feedback from a UE device to a communications controller while the SCC can only carry data traffic. In the 3GPP Rel-10 specification, a component carrier is called a cell. When multiple cells are controlled by a same eNB, cross scheduling of multiple cells can be implemented because there may be a single scheduler in the same eNB to schedule the multiple cells. With CA, one eNB may operate and control several component carriers forming primary cell (Pcell) and secondary cell (Scell). In Rel-11 design, an eNB may control both a Macrocell and a Picocell. In this case, the backhaul between the Macrocell and the Picocell is fast backhaul. The eNB can control the transmission/reception of both macrocell and Picocell dynamically.

Figure 1D:
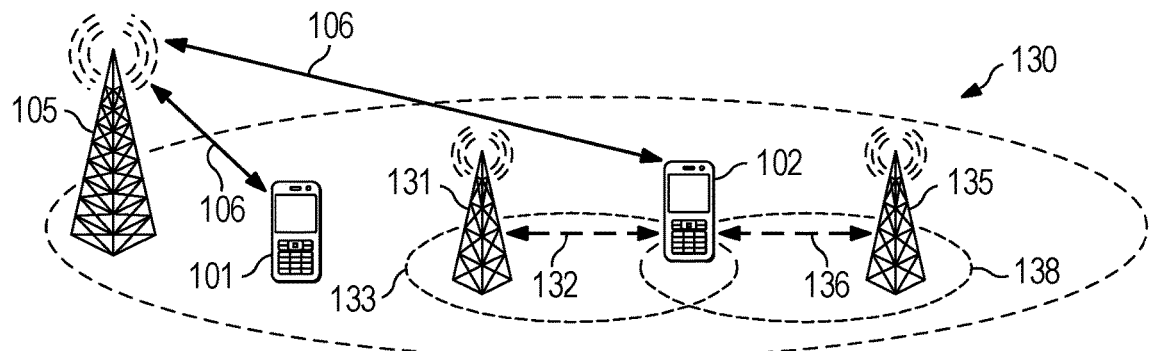

FIG. 1D is an illustration of another wireless heterogeneous network. As shown in FIG. 1D, system 130 is an example wireless heterogeneous network with communications controller 105 communicating to wireless device 101 using wireless link 106 (solid line) and to wireless device 102 using wireless link 106. A second communications controller 131, such as a small cell, has a coverage area 133 and is capable of communicating to wireless device 102 using wireless link 132. A communications controller for another small cell 135 has coverage area 138 and is capable of communicating to wireless device 102 using wireless link 136. Coverage areas 133 and 138 may overlap. The carrier frequencies for wireless links 106, 132, and 136 may be the same or may be different.

Figure 1E:
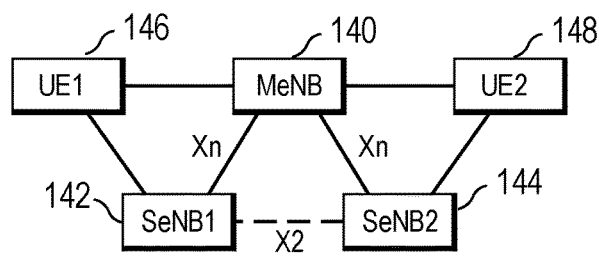

FIG. 1E shows an example system configured for dual connectivity. A master eNB (MeNB) 140 is connected to one or more secondary eNBs (SeNBs) 142 and 144 using an interface such as the Xn interface (Xn can be X2 in some specific cases). The backhaul can support this interface. Between the SeNBs, there may be an X2 interface. A UE, such as UE1 146, is connected wirelessly to MeNB and SeNB1. A second UE, UE2 148, can connect wirelessly to MeNB and SeNB2.

Figure 2A:
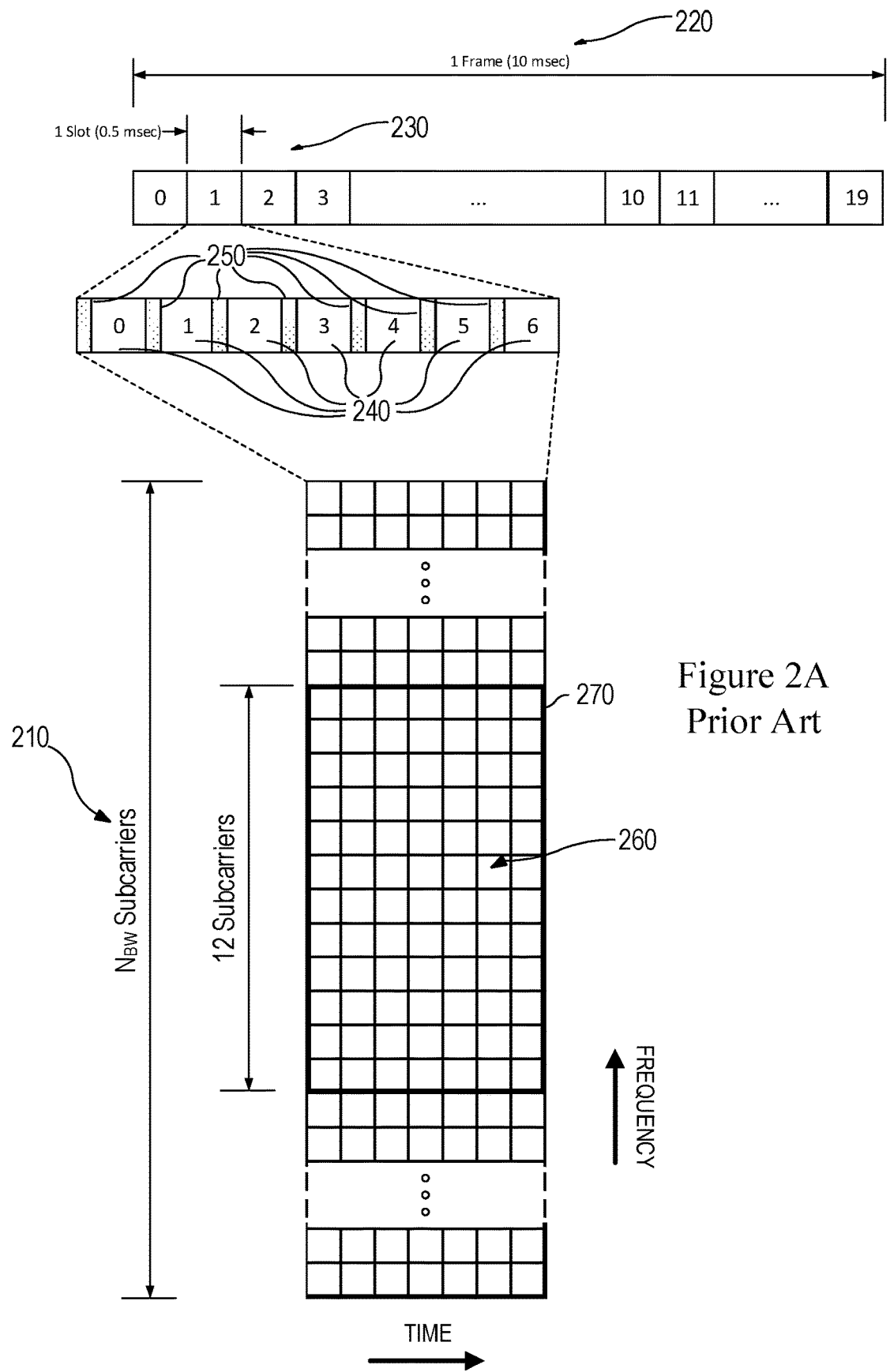
FIGS. 2A-2D illustrate orthogonal frequency division multiplexing (OFDM) symbols with normal cyclic prefix (CP) as commonly used in LTE transmissions.

FIGS. 2A-2D illustrate orthogonal frequency division multiplexing (OFDM) symbols with a normal cyclic prefix (CP) as used in LTE transmissions. FIG. 2A illustrates an OFDM frame as used in, for example, LTE based wireless links. In OFDM systems, the available frequency bandwidth is divided into multiple subcarriers in the frequency domain. In the time domain, each frame 220 is divided into twenty slots 230. Each slot is divided into multiple OFDM symbols 240. Each OFDM symbol may have a cyclic prefix 250 to avoid the inter-symbol interference due to multipath delays.

One resource element (RE) 260 is defined by the time-frequency resource within one subcarrier and one OFDM symbol. A grouping of 72 REs in a group that is 12 subcarriers wide by one slot long is called a resource block 270. A reference signal and other signals, such as a data channel, e.g. physical downlink shared channel (PDSCH), and a control channel, e.g. physical downlink control channel (PDCCH), are orthogonal and multiplexed in different resource elements in time-frequency domain. Further, the signals are modulated and mapped into resource elements 260. For each OFDM symbol 240, the signals in the frequency domain are transformed into the signals in time domain using, e.g., Fourier transforms, and are transmitted with added cyclic prefix 250 to avoid inter-symbol interference.

Each resource block (RB) 270 contains a number of REs. FIG. 2A illustrates example OFDM symbols with normal cyclic prefix (CP). Two slots are known as a subframe. There are 14 OFDM symbols labeled from 0 to 13 in each subframe. The symbols 0 to 6 in each subframe correspond to even numbered slots, and the symbols 7 to 13 in each subframe correspond to odd numbered slots. In the figure, only one slot of a subframe is shown. There are 12 subcarriers labeled from 0 to 11 in each RB 270, and hence in this example, there are 12×14=168 REs 260 in a RB pair (an RB is 12 subcarriers by the number of symbols in a slot). In each subframe, there are a number of RBs. The number depends on the assigned bandwidth (BW).

Figure 2B:
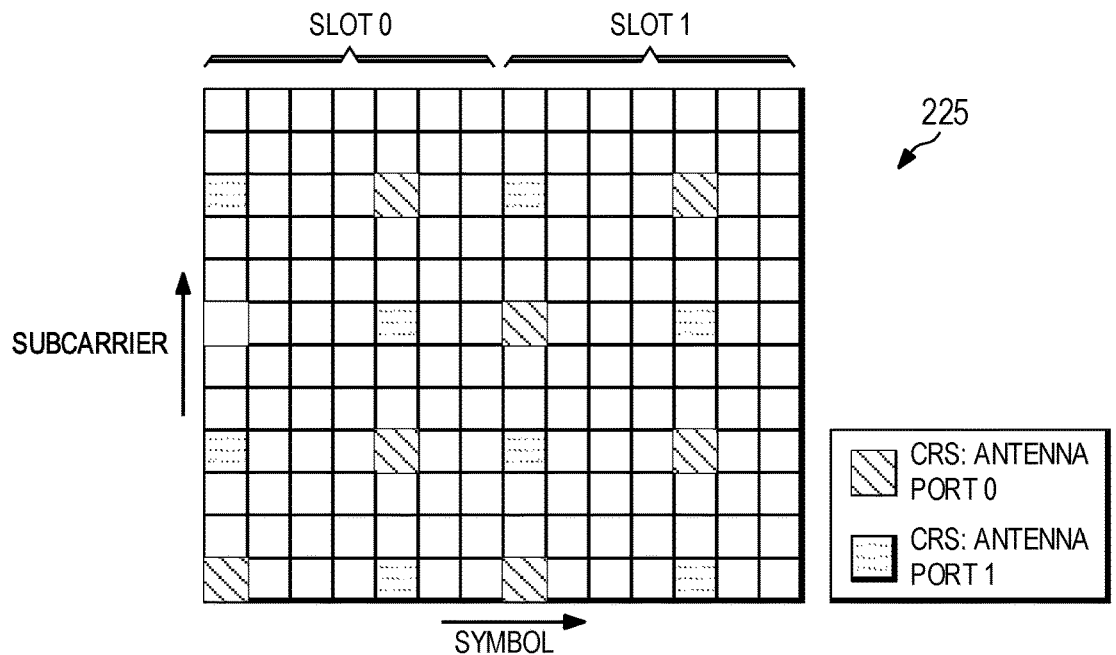

In downlink transmission of LTE-A system, there is reference signal for a UE to perform channel estimation for demodulation of PDCCH and other common channels as well as for measurement and some feedbacks, which is cell-specific reference signal (CRS) inherited from the Rel-8/9 specification of E-UTRA, as shown in FIG. 2B. A dedicated/de-modulation reference signal (DMRS) can also be transmitted together with the PDSCH channel in Rel-10 of E-UTRA. DMRS is also for channel estimation during PDSCH demodulation. DMRS can also be transmitted together with the enhanced PDCCH (EPDCCH) for the channel estimation of EPDCCH by the UE. The notation (E)PDCCH indicates EPDCCH and/or PDCCH.

Figure 2C:
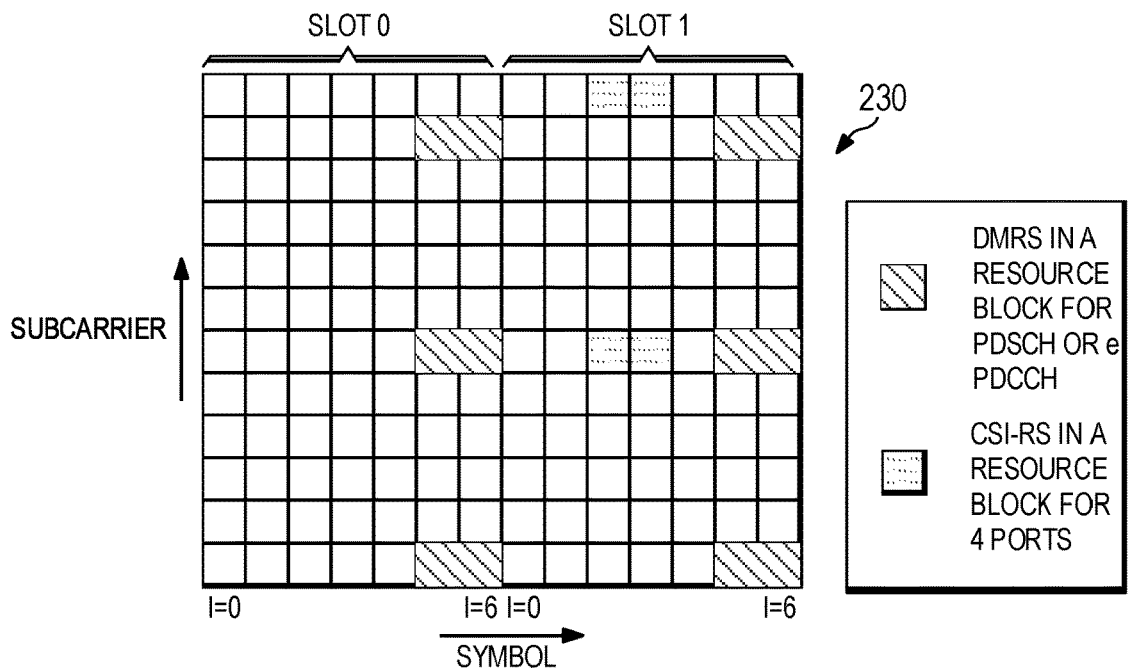

In Rel-10, channel status indicator reference signal (CSI-RS) was introduced in addition to CRS and DMRS, as shown in FIG. 2C. CSI-RS is used for Rel-10 UEs to measure the channel status, especially for multiple antennas cases. The precoding matrix indicator (PMI)/channel quality indicator (CQI)/rank indicator (RI) and other feedback may be based on the measurement of CSI-RS for Rel-10 and beyond UE. There may be multiple CSI-RS resources configured for a UE. There is specific time-frequency resource and scrambling code assigned by the eNB for each CSI-RS resource.

Figure 2D:
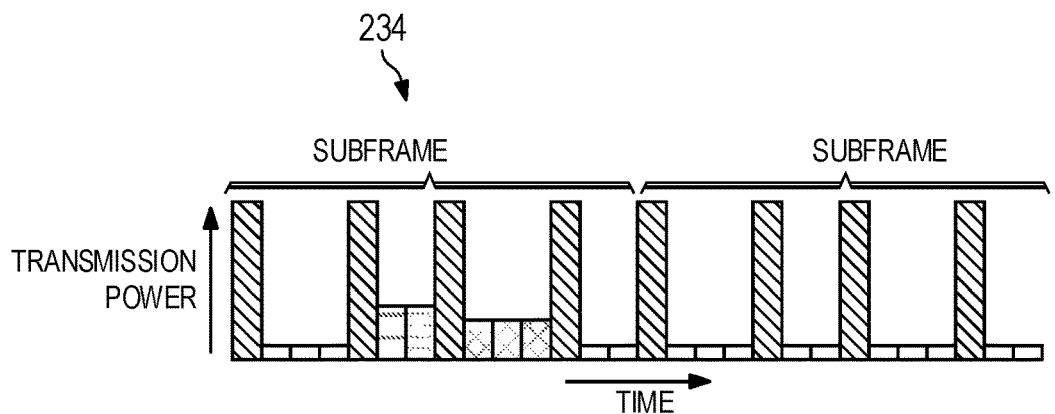

FIG. 2D shows an exemplary plot 234 of the transmission power from a communications controller, such as 105 in FIG. 1A, for subframes 0 and 1 in an FDD configuration. Plot 234 shows the communication controller still transmits signals such as the CRS (diagonal shading), the SSS (horizontal shading), the PSS (dotted shading), and the PBCH (diagonal cross hatch shading) even if there is no other data to transmit on the downlink. The transmission of these signals can increase the interference observed in a system such as in FIG. 1B even when communications controller 121 is not serving a UE such as wireless device 102. This interference can reduce the system's capacity. However, eliminating these signals entirely can impair system operation. For example, a wireless device relies on these signals to synchronize (both time and frequency) and then make measurements.

Figure 3:
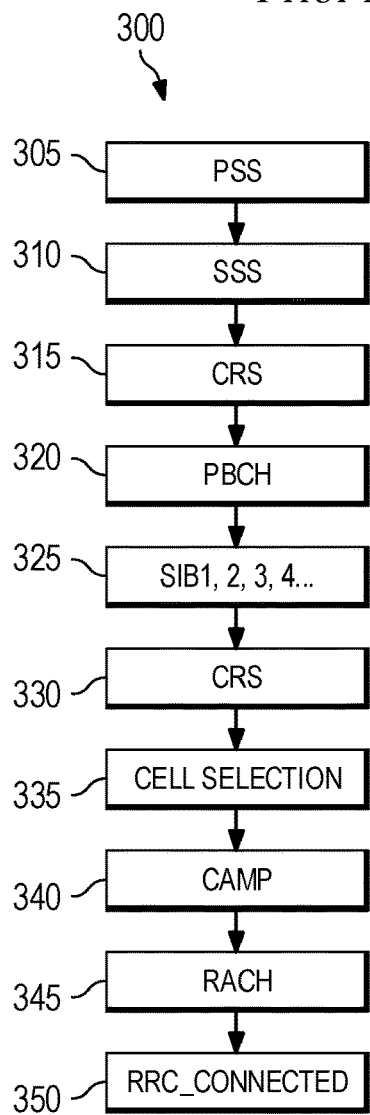
FIG. 3 is flowchart of one example of a wireless device using LTE reference signals (RS) to perform synchronization.

FIG. 3 is flowchart of one example of a wireless device using LTE reference signals (RS) to perform synchronization. The wireless device first detects the transmitted PSS in step 305. The wireless device can then detect the SSS in step 310. Having both the PSS and SSS provides the wireless device information such as: 1) frame configuration (FDD or TDD); 2) cyclic prefix used for certain downlink subframes; 3) the cell id; and 4) the location of subframe 0. In addition, the wireless device can perform coarse frequency and timing synchronization using the PSS and SSS.

Since the wireless device knows the cell id, cyclic prefix, and location of subframe 0, the wireless device can make measurements on the CRS in subframes 0 and 5 as shown in step 315. Example measurements are the reference signal received power (RSRP), the received signal strength indicator (RSSI), and the reference signal received quality (RSRQ). The CRS can be used to improve frequency and timing synchronization. If the measurements indicate that the communications controller is satisfactory (in terms of received signal quality), the wireless device may choose to process the PBCH to determine other information such as the number of antenna ports over which the CRS is transmitted, the frame numbering (e.g., 0 to 1023), and the downlink bandwidth (bandwidth of the downlink carrier) as shown in step 320.

The remaining steps in FIG. 3 show how the UE can become assigned to an eNB. In step 325, the UE listens to system information broadcast (SIB) messages, such as SIB1, SIB2, etc. To listen to SIB messages, the UE typically receives the PDCCH to process the downlink control information (DCI) to obtain the modulation, coding, etc. information for the PDSCH carrying the SIB message. In step 330, the UE may process the CRS more for measurement purposes. In step 335, the UE may compare cells in one or more carriers and select a suitable one. In step 340, the UE may decide to camp on this carrier. In step 345, the UE may begin the random access procedure by transmitting the random access channel (RACH) on the uplink in order to enter the radio resource control connected (RRC_CONNECTED) state in step 350. There may be a message exchange in step 350 between the UE and eNB. UEs have two states: RRC_CONNECTED and RRC_IDLE; the term "connected" can represent RRC_CONNECTED while "idle" can represent RRC_IDLE.

One concept to reduce the interference from eNBs without any UEs attached (assigned, camped) is to turn those eNBs off. When UEs arrive, the eNBs would then turn on. Likewise, when there is no more traffic, the eNBs could then turn off. However, there are many modifications to the standards necessary in order to support the on-off mechanism (on/off adaptation). For example, it must be determined how the UE can identify and measure the quality of an eNB based on signals such as the PSS, SSS, and CRS; when those signals are absent. Other questions regarding small cell on/off adaptation, or more generally, regarding network adaptation, include:

a. Coverage issue: how can adequate cellular coverage be ensured despite small cell on/off?
b. Idle UE issue: how can small cell operating in on/off mode support UEs in the idle state, what needs to be done to support idle UEs, in the connected state can the UE/eNB exchange data?
c. Legacy UE support: how can UEs that do not have this feature be supported?
d. How may fast on/off adaptation be supported? More specifically, how may fast on/off adaptation be supported, given newly introduced procedures/mechanisms (in Rel-11/12 or even beyond) such as small cell discovery and measurement enhancements; dual connectivity or more broadly, multi-stream aggregation (MSA); CoMP and enhanced CoMP (eCoMP) (including CoMP Scenario 4 (a network with low power RRHs within the macrocell coverage where the transmission/reception points created by the RRHs have the same cell IDs as the macrocell), coordination over non-ideal backhaul); massive carrier aggregation, etc.?

A secondary cell (e.g., cell 135 of FIG. 1D) that is operating on/off adaptation or power adaptation frequently (e.g., in time scale shorter than hours) may not be suitable to support idle UEs because rapid adaptation can cause the idle UE to enter cell reselection frequently and thus consume additional power. Similarly, a secondary cell operating in on/off adaptation may not be suitable for the coverage support that a macrocell can provide. Such a secondary cell may be primarily used to support high traffic demand in addition to the basic functionalities provided by the coverage layer. The cells providing the high traffic coverage layer may not perform on/off adaptation (at least they should not do so frequently). In this case, idle UEs may only be connected to coverage layer cells. A consequence of this is that small cells do not have to be standalone cells at least from the perspective of legacy UEs. In certain isolated local areas, however, there may be some scenarios where coverage is not a concern and high capacity is desirable; in such cases standalone small cells operating on/off may be deployed.

Therefore, typical deployment scenarios include a coverage layer whose cells do not perform network adaptation (or at least not too frequently or significantly), and a capacity layer whose cells (mainly small cells) may perform network adaptation. Coverage/mobility and idle UE support are mainly provided by the coverage layer. Typically, UEs connect to cells in the coverage layer first, and then connect to small cells in the capacity layer when needed. The small cells may be co-channel or non-co-channel with those in the coverage layer. One example deployment is shown in FIG. 1B.

In an embodiment, as one efficient way to deploy and operate the small cells, a virtual cell configuration (e.g., CoMP Scenario 4) is adopted, and the small cells are configured and turned on opportunistically for UEs with high traffic demand. Thus, in such a network, coverage and idle UE support are ensured and not affected by small cell adaptation.

The mechanism of dynamic on/off of a small cell is seen as more beneficial when further evolution of the small cell networks is envisioned. Specifically, to handle the ever increasing needs in data capacity, while meeting customer quality of service expectations and operators' requirements for cost-effective service delivery, the densification of a small cell network is proposed. Roughly speaking, doubling the density of the small cell network can yield doubling of the capacity of the network. However, densification leads to higher interference, especially the interference caused by common channels (e.g. CRS) which are persistently transmitted. Turning off the small cell opportunistically can significantly help reduce interference and improve efficiency of the dense network.

In parallel with increasing the network resources by densifying the network, another way to increase the network resources is to utilize more and more usable spectrum resources, which include not only the licensed spectrum resources of the same type as the macro, but also the licensed spectrum resources of different type as the macro (e.g., the macro is a FDD cell but a small cell may use both FDD and TDD carriers), as well as unlicensed spectrum resources and shared spectrums. The unlicensed spectrums can be used by generally any user, subject to regulation requirements. Traditionally the unlicensed spectrums are not used by cellular networks as it is generally difficult to ensure quality of service (QoS) requirements. Operating on the unlicensed spectrums mainly include wireless local area networks (WLAN), e.g. the Wi-Fi networks. Due to the fact that the licensed spectrum is generally scarce and expensive, utilizing the unlicensed spectrum by the cellular operator may be considered. To meet the regulatory requirements of operating in the unlicensed spectrum and to co-exist with other radio access technologies (RATs) such as Wi-Fi, the transmissions on the unlicensed spectrum cannot be continuous or persistent. Rather, on/off, or opportunistic transmissions and measurements on demand may be adopted.

Thus, it can be seen that when considering further evolution of the small cell networks, the main scenarios may be small cell networks with abundant resources in both node-density dimension and spectrum dimension. Such scenarios may be called hot areas, which indicate enlarged areas as compared to hot spots. Such hot areas are generally deployed and controlled by the network operators. For such hot areas, discontinuous, opportunistic, or on-demand transmissions (and reception) and measurements (of signals and/or various types of interference) on flexibly selected resources are needed.

Figure 4A:
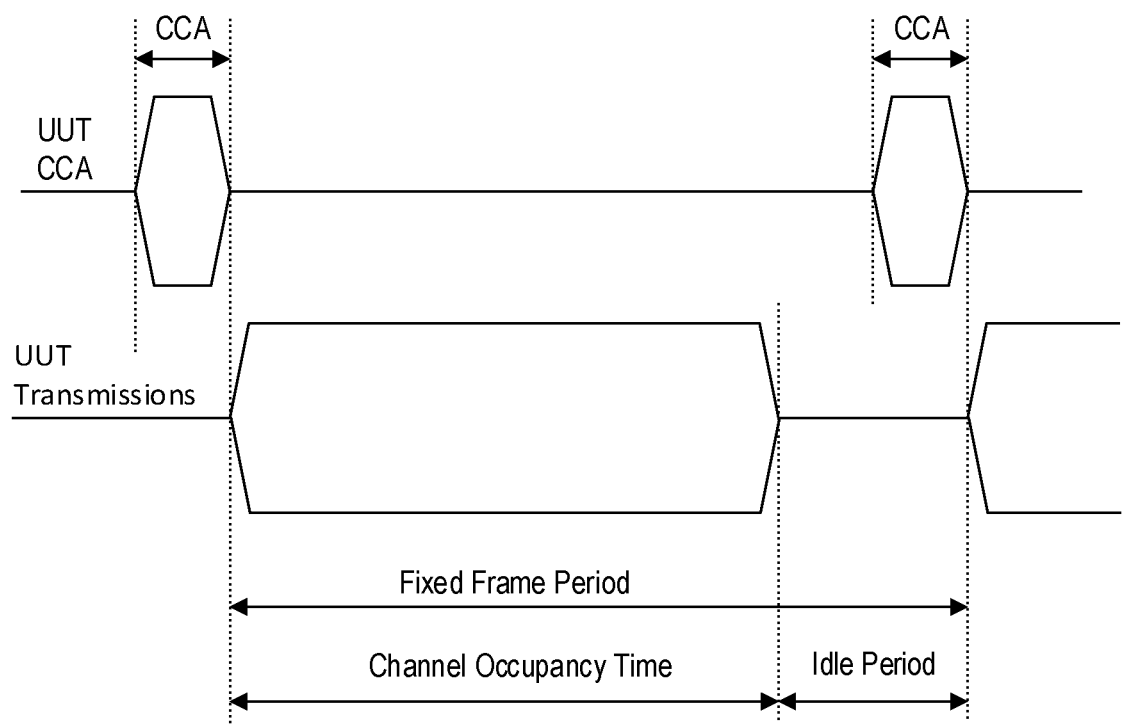
FIGS. 4A-4D illustrate the operation of OFDM in WiFi as an example of a listen-before-talk mechanism.
Figure 4B:
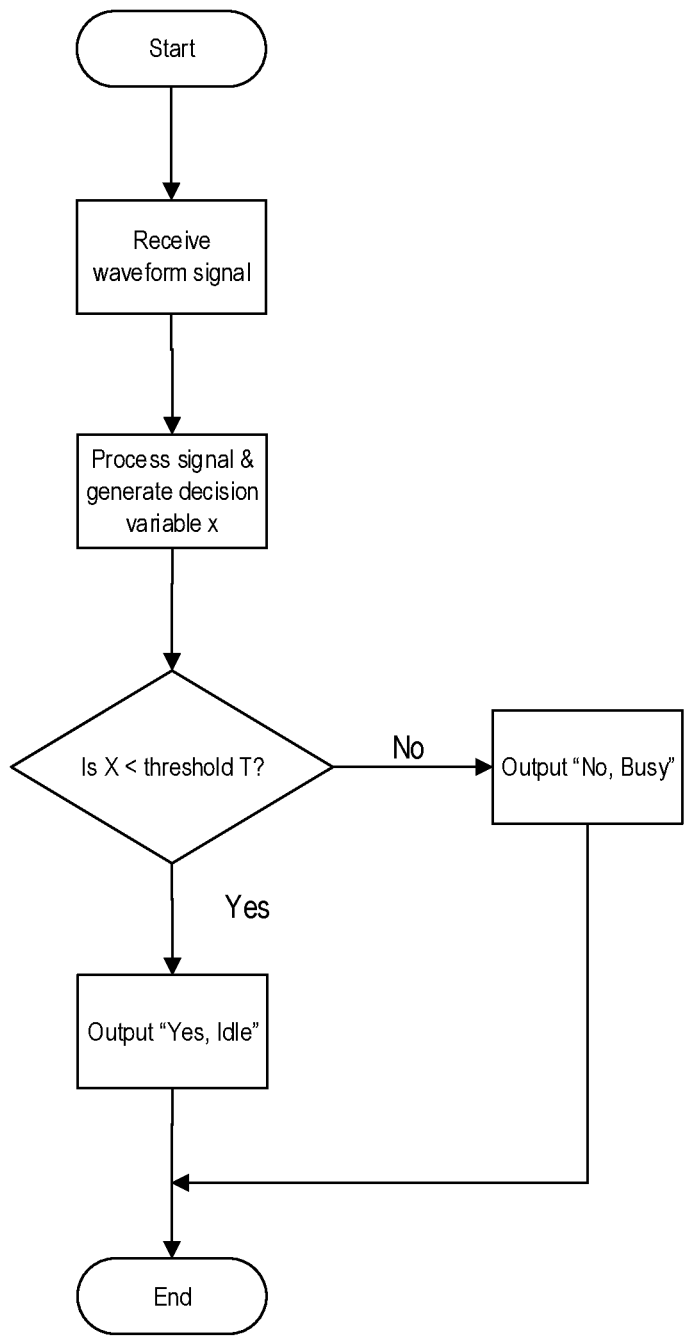
Figure 4C:
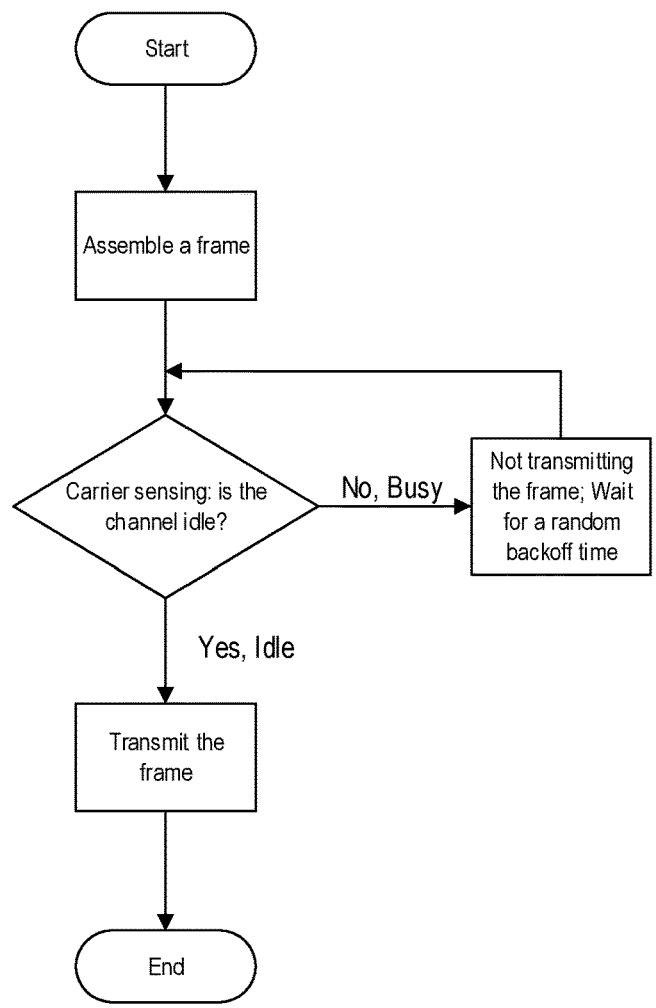
Figure 4D:
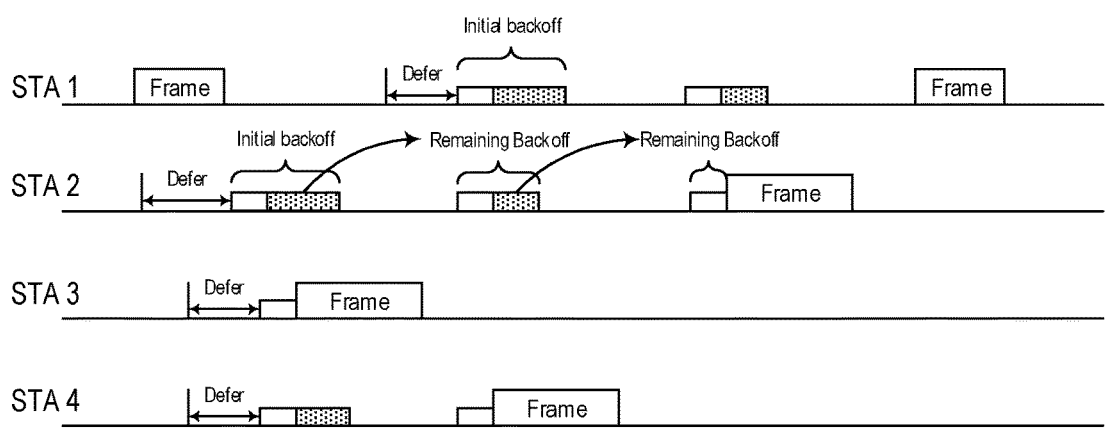

FIGS. 4A-4D illustrate the operation of OFDM in WiFi as an example of a listen-before-talk mechanism. WiFi uses 802.11 standards technologies as air interface (including physical and medium access control (MAC) layer). In 802.11, the communication channel is shared by stations under a mechanism called distributed channel access with a function called DCF (distributed coordination function), which uses carrier sense multiple access with collision avoidance (CSMA/CA). The DCF uses both physical and virtual carrier sense functions to determine the state of the medium. The physical carrier sense resides in the PHY and uses energy detection and preamble detection with frame length deferral to determine when the medium is busy. The virtual carrier sense resides in the MAC and uses reservation information carried in the Duration field of the MAC headers announcing impeding use of the wireless channel. The virtual carrier sense mechanism is called the network allocation vector (NAV). The wireless channel is determined to be idle only when both the physical and virtual carrier sense mechanisms indicate it to be so. A station with a data frame for transmission first performs a clear channel assessment (CCA) by sensing the wireless channel for a fixed duration, i.e., the DCF inter-frame space (DIFS). If the wireless channel is busy, the station waits until the channel becomes idle, defers for a DIFS, and then waits for a further random backoff period (by setting the backoff timer with an integer number of slots). The backoff timer decreases by one for every idle slot and freezes when the channel is sensed busy. When the backoff timer reaches zero, the station starts data transmission. An example of timing for such Frame Base Equipment is illustrated in FIG. 4A. An example of the flow chart for carrier sensing is illustrated in FIG. 4B. An example of the flow chart for a general listen-before-talk mechanism is illustrated in FIG. 4C. The channel access procedure is shown in FIG. 4D.

To meet the regulatory requirements of operating in the unlicensed spectrum and to co-exist with other radio access technologies (RATs) such as Wi-Fi, the transmissions on the unlicensed spectrum cannot be continuous or persistent in time. Rather, on/off, or opportunistic transmissions and measurements on demand may be adopted.

In addition, for operations in high-frequency bands, especially in the bands at 28 GHz to 60 GHz, they generally belong to the mmWave regime, which has quite different propagation characteristics from microwave (generally below 6 GHz). For example, mm Wave experiences higher pathloss over distance than microwave does. Therefore, high-frequency bands are more suitable for small cell operations than macrocell operations, and they generally rely on beamforming with a large number of antennas (e.g. >16, and sometimes maybe even a few hundred) for effective transmissions. Note that at high frequency, the wavelengths, antenna sizes, and antenna spacing can all be smaller than those at low frequency, thus making it feasible to equip a node with a large number of antennas. As a result, the beams formed by the large number of antennas can be very narrow, for example, with beam width of 10 degrees or even less. In sharp contrast, in traditional wireless communications, beam width is generally much wider, such as tens of degrees. In future more and more mm Wave bands may be usable by cellular, either as unlicensed carriers or licensed carriers.

Thus, it can be seen that when considering further evolution of the small cell networks, the main scenarios may be small cell networks with abundant resources in both node-density dimension and spectrum dimension, where the spectrum resources may be in low-frequency (sub-3 GHz or sub-6 GHz) and/or high frequency (above 6 GHz or even above 28 GHz), and/or in unlicensed/shared-licensed/licensed bands. The small cells are overlaid with wider-area macrocells. Such scenarios may be called hot areas, which indicate enlarged areas as compared to hot spots. Such hot areas are generally deployed and controlled by the network operators. For such hot areas, discontinuous, opportunistic, or on-demand transmissions (and reception) and measurements (of signals and/or various types of interference) on flexibly selected resources are needed.

An embodiment provides a framework of methods/designs suitable for hot areas, which may allow for operations in licensed and/or unlicensed spectrum. That is, the designs may be spectrum agnostic. The spectrum agnostic designs have certain advantages. If, instead, the main design framework is to customize the designs for different spectrums, then separate designs will definitely occur and they will grow further and further apart as time goes, making the specifications, implementation, and operation more complex. Therefore, it is preferred to have a unified framework over two or more separate frameworks for licensed and unlicensed, such as framework 500 in FIG. 5. The unified framework is also feasible, since the main issues and hence main features for dense cellular operations and unlicensed LTE (U-LTE) operations share many commonalities, such as interference issues, non-existence of persistent DL RS (e.g. CRS), etc. In essence, a communication system may be boiled down into several building blocks for features/functionalities, e.g., measurements, access schemes, link adaptation, etc. Each can be further boiled down into smaller blocks. At a lower level, the operations for licensed and unlicensed are similar. Once these blocks are well defined, configuration signaling can be used to specify how the interconnected system may work in different types of spectrums. If certain branching-off is needed, it can be at suitable levels and the branches can be selected by network configuration signaling.

The desirable high-level features include adaptation, intra-RAT coordination, and inter-RAT co-existence. More specifically, they may be realized by means of load balancing/shifting, power control/adaptation, other interference coordination/avoidance such as probing. To enable these high-level features, the following embodiments may be adopted.

An embodiment method is adaptive resource selection. In other words, the network may adaptively select a subset of cell and/or carrier resources to be used for a UE. As there are more node resources and spectrum resources to be included in the network, from the UE perspective, it can discover multiple "cells" (a licensed component carrier, or CC, is generally viewed as a cell according to carrier aggregation; other nodes or carriers may be viewed as virtual cells or generalized cells with virtual cell IDs which may or may not be related to physical cell IDs). These cells may be configured for the UE (in slow time scale, for example), but not all will be used. The network selects a subset of the cells and signals to the UE (e.g., via RRC or MAC signaling, or via physical layer signaling for fast response). If a cell is not selected for any UE, it may be turned off and transmit only in a discovery burst (discovery RS burst, or DRS burst). If a cell is selected, the cell has to be on or turned on. The transition time should be as short as possible. In one embodiment, the bandwidth of a cell is not predetermined, but determined when it is selected for use or determined on the fly by the transmissions. For example, the cell and/or the UE may sense the usage of the spectrum and then decide on a portion of the spectrum which is less occupied.

An embodiment provides methods for adaptive transmission and reception. On the selected resources, discontinuous, opportunistic, and on-demand transmissions and receptions may occur. To enable such transmissions, embodiments of link adaptation, hybrid automatic repeat request (HARQ), timing advance, power control, etc., need to be provided.

An embodiment provides methods for measurements and reporting on demand. The measurements include signal measurements and measurements of various types of interference. Without persistently transmitted CRS and to support opportunistic transmissions, the measurement mechanisms, discovery, and synchronization need to be redesigned. Various types of interference measurement resources (IMRs) or interference sensing resources may need to be configured, with different types of IMRs suitable for different types of interference, such as intra-system (within the network controlled by the same cellular operator) interference, intra-RAT (for networks controlled by different cellular operators) interference, inter-RAT (e.g., between U-LTE and Wi-Fi), and so on.

In an embodiment, the HARQ is implemented across more than one carrier. For example, a first transmission results in detection/decoding error, and the data is to be retransmitted. If the retransmission has to occur in the carrier, it may be delayed indefinitely depending on the channel sensing results. Thus, it may be useful to perform the retransmission on a different, available carrier, such as a licensed carrier with more reliability. This is different from existing mechanisms. For UL HARQ, it needs to be changed from synchronous to asynchronous, and include the HARQ number in the scheduling information. For DL HARQ, the UE needs to be signaled with necessary information to combine the transmissions from possibly different carriers. From a UE capability perspective, the total HARQ process number need not be larger and may be kept the same for each carrier. Additional information can be added so that the transmissions associated with one HARQ process are associated with the same information (e.g., an index), and that information may be added into the scheduling DCI. There may also be a semi-statically defined mapping by RRC signaling, down selecting candidate carriers for a HARQ process, thus reducing the signaling overhead for DCI.

Figure 5:
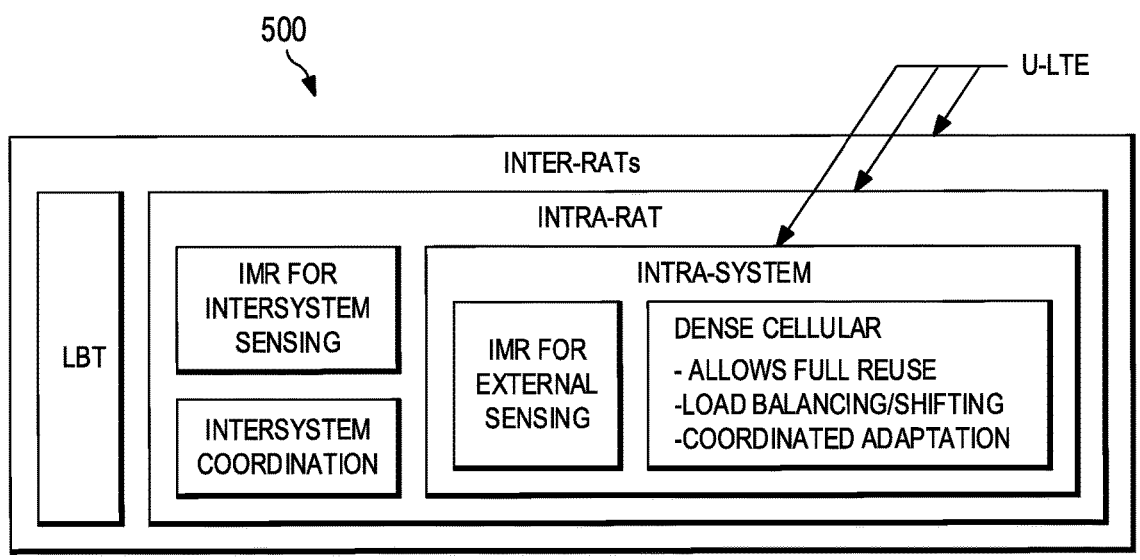
FIG. 5 illustrates an embodiment framework that can be used for different scenarios.

FIG. 5 illustrates an embodiment framework that can be used for different scenarios. As shown in FIG. 5, the design features for one scenario may be a subset of another scenario. If all the features are included and designed for a network, then the network may adjust its configuration for the scenario, by selecting and combining included features, tweaking the parameters, etc. It can be seen that the core features are those designed for dense cellular, which are more advantageous than Wi-Fi designs under heavy traffic load and should be preserved for U-LTE if possible. When U-LTE is used, within the same system (i.e. intra-system) controlled by an operator, the main additional feature is the embodiment method of sensing external interference (i.e. non-U-LTE interference, mainly the Wi-Fi interference) based on new designs of IMR. For the intra-RAT case, all features in intra-system case can be used for intra-system operations, with the additional IMR for inter-system sensing, and based on the sensing/measurement results, inter-system coordination in a generally slow or semi-static time scale may be performed. In the inter-RAT case, with the co-existence of U-LTE and Wi-Fi, all features in the intra-RAT case can be used for intra-RAT operations, and the additional feature is to support listen-before-transmission (or listen-before-talk, LBT). Not all dense cellular features can be used for inter-RAT operations, e.g., full reuse, load balancing/shifting, coordination, since these require coordination which is not available in Wi-Fi, and since Wi-Fi lacks interference tolerance capability and mainly relies on interference avoidance. However, other dense cellular features, such as cell on/off, link adaptation, HARQ, discovery/IMR, probing, power control/adaptation, etc., can also be used for U-LTE inter-RAT operations.

Network adaptation, or adaptive transmission, has been studied in 3GPP, such as small cell on/off based on existing procedures. However, the main focuses have been reusing existing procedures, such as handover, Scell activation/deactivation, and dual connectivity procedures, to achieve small cell on/off in semi-static time scales. The on/off may be in a couple tens of milliseconds to hundreds of milliseconds. Faster or more dynamic on/off is also desirable, as it offers even higher performance gains and it is potentially necessary for U-LTE support. Thus, new procedures, mainly new Layer 1 (physical layer, or L1) procedure, are needed.

Compared with small cell on/off based on legacy procedures (e.g., handover, Scell activation/deactivation), small cell on/off based on the new L1 procedure may have its distinct properties, scope, target, and scenarios.

Scope: Small cell on/off based on the new L1 procedure should not rely on legacy procedures (handover and Scell activation/deactivation) for on/off. In addition, the new L1 procedure should limit its standards impacts mainly to the physical layer, and it should not lead to significant impacts on higher layers (MAC, RRC, etc.), as in general the physical layer is more dynamic and flexible than higher layers. However, necessary supports by higher layers should not be precluded.

Target: The new L1 procedure should result in reduced transition times compared to on/off based on existing procedures such as handover or Scell activation/deactivation. The new L1 procedure should lead to fast on/off, whereas on/off with the existing procedures falls into the category of semi-static on/off.

According to 3GPP 36.133, if a valid radio resource management (RRM) measurement is available, then an activation time of less than 24 ms can be feasible based using existing Scell activation/deactivation procedures. This 24 ms includes 4 ms of MAC CE decoding time and at least 4 subframes of DL transmission. In the case of TDD carrier with TDD configuration 0, it takes 20 ms for the UE to receive 4 DL subframes. In FDD cases, it takes only 4 ms for the UE to receive 4 DL subframes, so a transition time of faster than 24 ms can be feasible with the legacy Scell activation procedure.

A new L1 procedure should lead to faster transitions. As concluded in 3GPP TR 36.872, reduced transition times lead to better performance. Therefore, at the subframe-level it is desirable to provide Scell on/off with high reliability without considerably increasing UE complexity. Thus, it is desirable to target the transition time to be no longer than the duration of one radio frame (10 ms) in the worst case, and subframe-level transition is desirable and should also be supported.

Scenarios: Different scenarios may mandate different requirements and different designs. Part or all of the following scenarios may be considered for the new L1 procedure:
  a. Co-located versus non-co-located: The Scell operating fast on/off may be co-located or non-co-located with the Pcell;
  b. Inter-band CA versus intra-band CA: The Scell operating fast on/off may be in a different band or the same band as the Pcell, and in the intra-band case, the carriers for the Scell and Pcell may be contiguous or non-contiguous;
  c. Synchronized versus un-synchronized: The Scell operating fast on/off may be time-synchronized or un-synchronized as the Pcell.

Both the design complexity and applicability of the new L1 procedure should be considered when defining the scenarios. At least the co-located and synchronized scenarios in both inter-band and intra-band should be considered, and un-synchronized scenarios may also be studied. Therefore, synchronized scenarios may be addressed first, and then un-synchronized scenarios may be addressed by further considering time/frequency tracking issues and related UE behavior issues.

How the Scell On/Off states are conveyed to the UE affects the UE complexity and reliability. For example, utilizing DCI to convey the On/Off states does not considerably increase the UE complexity since the UE can already perform such operations. Furthermore, if the DCI is sent from the Pcell only, then the UE complexity for receiving the indication is regarded as low since the UE does not have to monitor the Scell all the time. In addition, using signals similar to existing ones (e.g. PDCCH/PDSCH) to carry the indication is regarded as reliable since their transmissions are well protected by existing mechanisms.

On the other hand, the UE complexity is regarded as considerably increased if the UE needs to autonomously detect whether a subframe is in the on state or off state, in every subframe for all activated Scells. The UE autonomous detection usually involves blind detection of RS (e.g. CRS) and/or (E)PDCCH, and in some cases the UE may need to hypothesize on the detection of the RS for its further (E)PDCCH decoding attempts. As a result, the reliability of the UE autonomous detection may not be consistent and depend on various factors, such as the channel quality, UE implementation of the blind detection, channel estimation result, synchronization accuracy between the UE and Scell, etc. A missed detection caused by any of the factors may be mistaken by the UE as the Scell being in the off state.

Therefore, a new L1 signaling should be included for the new L1 procedure to indicate the On/Off states of a Scell. This can support Scell fast on/off at any subframe with low UE complexity and high reliability (depending on the specific design).

For the following descriptions of the embodiments for dynamic on/off support, a few basic assumptions must to be made. With regard to transition time between on/off states, a few clarifications need to be made for defining transition time. For example, how are the on/off states defined? The on/off states may be defined from an eNB perspective or a UE perspective. Based on how the on/off states are defined, the transition time may be defined accordingly. Alt 1: define the transition time between on/off states from a UE perspective (e.g. from a time that UE does not monitor the Scell to the time that UE can receive data); Alt 2: define the transition time between on/off states from an eNB perspective (e.g. from the time that the data arrives at the eNB MAC buffer to the time that eNB transmits RS or eNB can transmit data to a UE).

Generally, UE behaviors (instead of eNB behaviors) are defined in the specifications. Therefore, it is more meaningful that the transition time between on/off states is defined from a UE perspective. This implies that at least for some downlink subframes the UE needs not monitor any downlink signal of a Scell performing fast on/off.

With regard to On/off granularity, i.e., any minimum-on-time (after transition from off to on state) and minimum-off-time (after transition from on to off state) restriction, the minimum-on-time and minimum-off-time depend on how the on/off states are defined. It is more meaningful to define them from a UE perspective to restrict UE behavior. In other words, once the UE transitions from the non-monitoring state to monitoring state, it needs to keep monitoring for at least a number of subframes defined by the minimum-on-time Likewise the minimum-off-time can be defined. The actual achievable values depend on the detailed solution.

With regard to assumptions on data availability/location (e.g., at eNB MAC buffer), to reduce potential impacts on upper layers, it should assume that data is available at eNB MAC buffer.

With regard to assumptions on CSI availability, it is desirable that CSI is available for reliable link adaptation. The way in which CSI may be made available depends on RS transmissions and UE monitoring behavior. To reduce overhead and interference caused by RS, periodic transmission of DL RS for CSI measurement may not be desirable, unless the RS is sparse in time domain (i.e. low overhead in time domain). One way to enable periodic transmission of RS by a cell performing on/off is to transmit the RS together with DRS (or the DRS contains an RS that can be used for CSI measurement). Otherwise, DL RS may be transmitted aperiodically, such as together with DL data.

With regard to timing advance (TA) availability, for UEs capable of supporting UL CA, TA for the Scell can be obtained based on existing mechanisms if decided by the network. Therefore, it can be assumed that TA can be made available when needed.

With regard to discontinuous reception (DRX) status (for example, no DRX configuration), to minimize potential impacts on upper layer, it is desirable not to introduce any new DRX behavior. In other words, UE may assume that the network will ensure it does not enter the DRX mode if it is configured to perform the new L1 procedure. This may be done in implementation. One way to achieve this is to not to configure DRX for UEs performing the new L1 procedure. Another way may be by coordinating DRX and on/off timing at the eNB. For example, by proper DRX configuration and proper Scell activation/deactivation configuration, the Scell will not enter DRX mode in its activated state if the Scell is intended to perform fast on/off.

With regard to PDCCH or EPDCCH reception at UE, the UE should monitor (E)PDCCH candidates in a subframe in the ON state (ON from the UE perspective), where monitoring (E)PDCCH implies attempting to decode (E)PDCCH according to all monitored DCI formats. The UE can enter the ON state according to network indication, such as L1 indication. Otherwise the UE does not monitor (E)PDCCH. The UE monitors (E)PDCCH during its ON state (ON from the UE perspective). In other words, in this case, the ON/OFF states of the UE correspond to (E)PDCCH monitoring/non-monitoring states, respectively. An alternative embodiment is that the UE always monitors (E)PDCCH from the Scell, regardless of the ON/OFF state of the Scell.

With regard to the availability of RRC RRM measurement (RSRP/RSRQ) at eNB, with the introduction of DRS and DRS-based RRM measurement, the RRM measurement results should be available at eNB if the eNB configures DRS and associated measurement.

With regard to the preferred criteria to trigger on/off transitions, the preferred criteria to trigger Scell on/off transitions may include packet arrival/completion, load balancing/shifting, and interference coordination, to list a few.

With regard to how to enable time/frequency tracking and automatic gain control at off to on transition, the time/frequency tracking may highly depend on the scenarios (e.g., synchronized or not) for which the new L1 procedure is designed. When the time-synchronized scenarios are considered, the time/frequency tracking of Scell can rely on the Pcell and no time needs to be spent on tracking during the off-to-on transition. For the case where un-synchronized or coarse synchronized carrier is assumed, time should be allowed to achieve time/frequency tracking, and the exact number of subframes for initial time/frequency tracking depends on the decision of DRS design. For example, if the DRS design is such that the timing obtained from one DRS occurrence can be maintained (e.g., within 3 us) till the next DRS occurrence, then zero subframe for initial time tracking is needed; otherwise more than one subframe is needed.

The delay caused by RF tuning (assuming RF is on) and AGC settling has been studied. From these related studies one may estimate that the delay caused by RF tuning and AGC settling may be a couple of OFDM symbol durations of 140 μs at most. However, the two symbols of 140 μs may be a loose upper bound in the activated Scell fast on/off case if periodic DRS/CSI-RS can be transmitted. The typical delay may be 0 symbols in such cases, or at most 1 symbol in some cases. This is because the UE can base its RF and AGC on the latest DRS/CSI-RS. Note that this requires a standardization support, i.e., the standards need to require the UE set its RF/AGC based on the latest DRS/CSI-RS, which is a new UE behavior. As generally the DRS periodicity is tens of milliseconds and CSI-RS periodicity is 5 ms and tens of milliseconds, at least the analog AGC remains valid, and the digital AGC can be adjusted digitally without causing any extra delay.

For the new L1 procedure based on fast on/off, the Scell performing fast on/off is assumed to be activated for the UE. And the UE assumes that DRS is present in the subframe configured with DRS regardless of the on/off state or DRX status, and CSI-RS is present in the subframe configured with CSI-RS during the activation.

Figure 6:
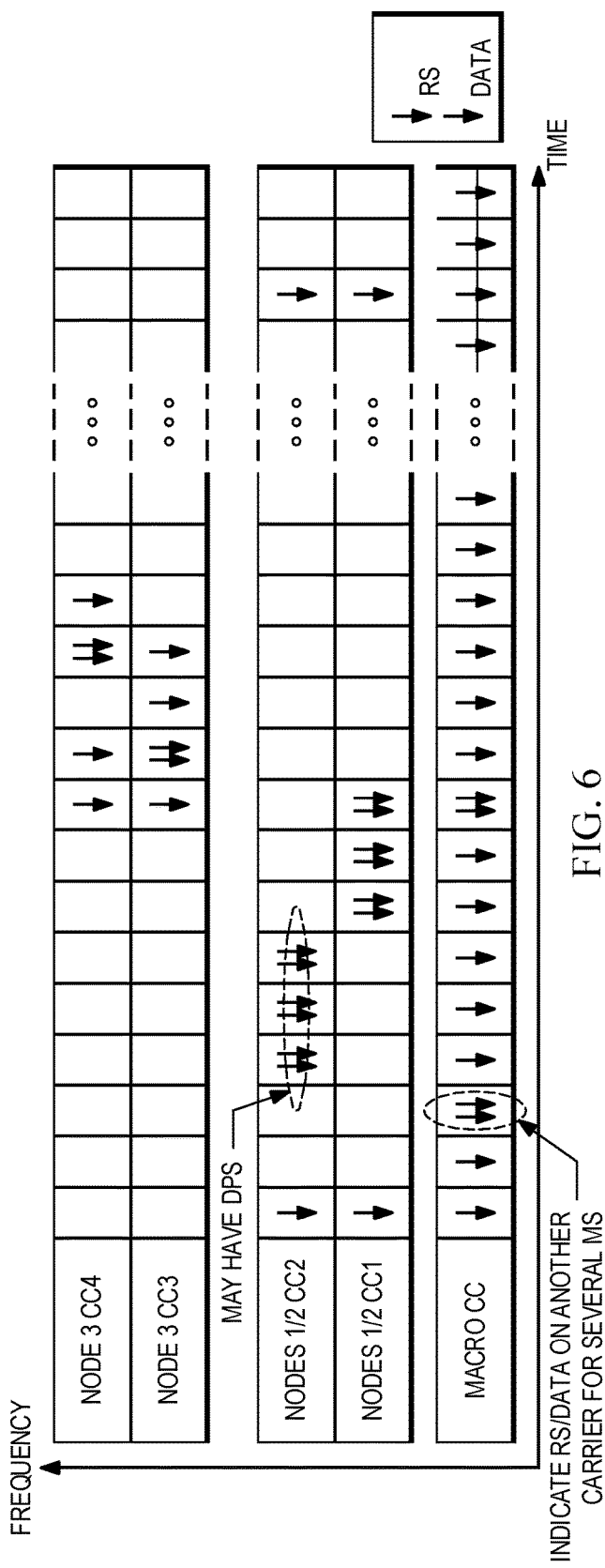
FIG. 6 illustrates an example of adaptive resource selection and opportunistic transmission/measurements.

FIG. 6 shows an example of adaptive resource selection and opportunistic transmission/measurements. The macro carrier normally acts as the Pcell, and does not turn off. It transmits CRS and other common channels regularly. The UE generally always monitors the macro CC for CRS, common channels, signaling related to other CCs, and possibly data. Besides the macro CC, the UE has discovered a number of cells (e.g., by DRS) and some of them may be configured to the UE as possible transmission points. Node1 and node2 may be small cell operating in licensed spectrum, and each may have more than one CC, e.g., CC1 and CC2. They may be connected via fast backhaul. They may transmit DRS regularly with long duty cycles. They may be turned off in non-DRS burst unless a measurement/transmission is needed. For example, the macro may indicate that in a next subframe (with delay of 0 subframe, 1 subframe, or more subframes), node 1 and/or node 2 may transmit RS and/or data in CC1/CC2. Then the nodes may be turned on and the UE starts to monitor and feedback CSI reports.

Depending on the channel quality, interference coordination purposes, load balancing/shifting, etc., dynamic point selection (DPS, or DPB for dynamic point blanking) may be performed. Different from DPS used in Rel-11 CoMP, here the RS transmission may be turned off if a cell is not selected, and the RS transmission may be turned on if a cell is selected. The scheduling information may be from the macro or any of the cells, but signaling may be sent from a transmitting cell to indicate how the UE may receive the scheduling information, such as in a subset of the cells in the next few subframes. Similarly, a cell may further indicate the UE to monitor cells on unlicensed spectrum (e.g. node 3 CC3 and node 3 CC4). These cells generally do not use periodic measurements, so aperiodic measurement may be triggered to provide link adaptation capability. Usually the measurement may precede the data transmission on the unlicensed cell, but they may also be transmitted at the same time when the cell is selected, with possibly higher decoding error probability or with conservative data transmissions until the measurement result is obtained by the network.

For the new L1 procedure based on fast on/off, the Scell performing fast on/off is assumed to be activated for the UE. And the UE assumes that DRS is present in the subframe configured with DRS regardless of the on/off state or DRX status, and CSI-RS is present in the subframe configured with CSI-RS during the activation. Given these assumptions, some design embodiments will be provided below for the new L1 procedure based fast on/off.

Figure 7:
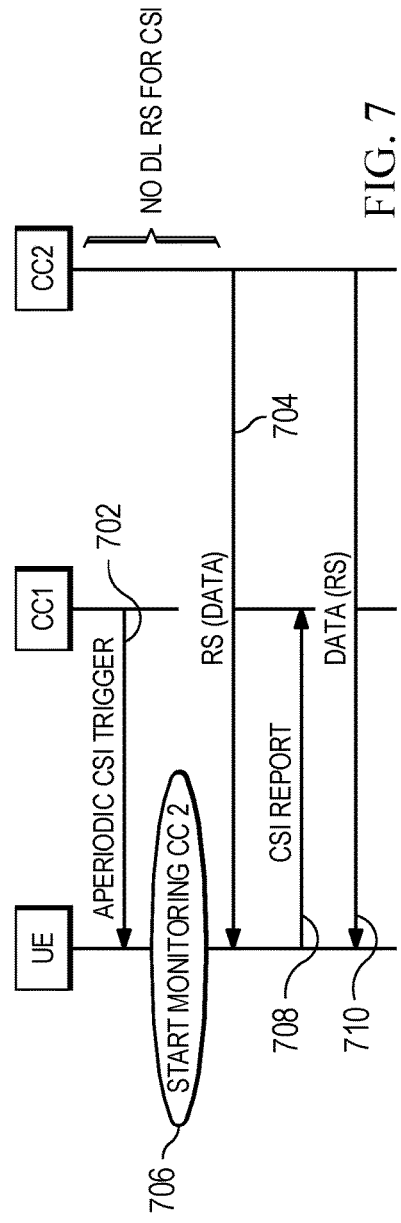
FIG. 7 shows an embodiment design of CSI measurement/feedback on demand for link adaptation.

FIG. 7 shows an embodiment design of CSI measurement/feedback on demand for link adaptation. In this figure, CC1 may be a carrier that the UE is monitoring (e.g., CC1 may be Pcell or an activated Scell). CC2 is an opportunistically on/off cell and has fast backhaul with CC1. There may not be DL RS for CSI measurements and reporting sent by CC2 when it is not selected. To support transmission on CC2, CC1 may transmit an aperiodic CSI trigger 702 for CC2. In the same time, CC2 may start RS transmission 704. Upon receiving the trigger, the UE starts monitoring CC2 706 (and possibly data). An aperiodic CSI report 708 may be generated and sent to the network (e.g. CC1). With the CSI report, CC2 can perform link adaptation for its transmissions accordingly and, for example, download data 710. Then the operations between UE and CC2 may be similar to existing ones, such as periodic RS for CSI measurements may be transmitted, and periodic CSI reporting may be performed. Alternatively, the UE may rely on RS detection to determine the presence of RS. One can see that even though the aperiodic trigger may reuse the one defined in current spec, it still leads to different UE behaviors as in the old scenarios, the UE has received RS for its CSI measurements, but a measurement report may not be generated or reported until the trigger is received; whereas in the new scenarios, the UE may not receive RS for its CSI measurements until the trigger is received.

The aperiodic CSI trigger may contain more information than the existing one. For example, it may tell the UE at least how long the UE should monitor CC2 (e.g., it may tell the UE to monitor at least 5 subframes, but for UE still receiving data on the $5^{th}$ subframe, the UE can keep monitoring after those 5 subframes). The turning on or CC2 may not be for only one UE; a number of UEs may need to receive the trigger. In this case, group DCI may be used to trigger measurements and reporting by a number of UEs. The trigger may also be used for specifying more than one cell. For example, it may ask a group of UEs to monitor several cells.

Figure 8:
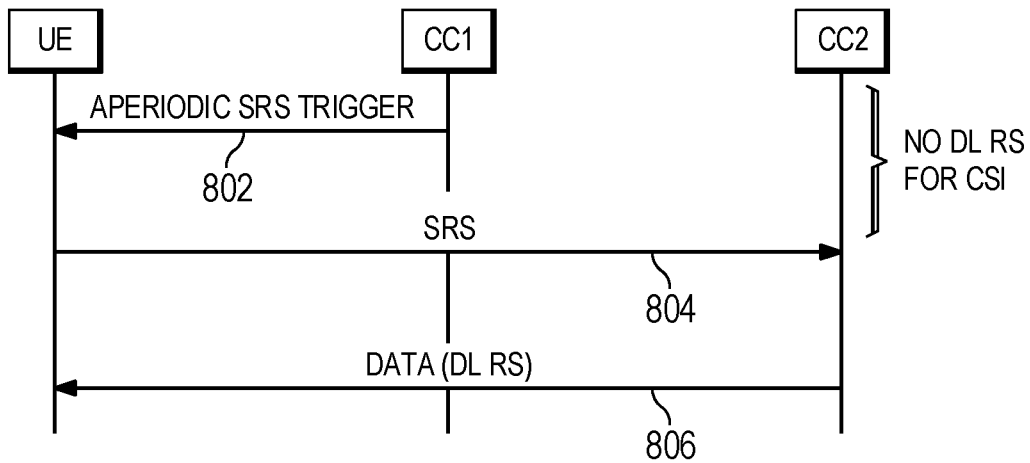
FIG. 8 shows another embodiment design of CSI measurement/feedback on demand for link adaptation.

FIG. 8 shows another embodiment design of CSI measurement/feedback on demand for link adaptation. In this case, CC1 transmits an aperiodic SRS (sounding reference signal) trigger 802 to the UE. The UE then sends SRS 804 to CC2 in the specified resource. The SRS may be used by CC2 as a turning-on trigger, and it can also be used for CSI measurements and possibly timing advance for the UE to use (signal back to the UE). Then CC2 starts to transmit data and possibly DL RS 806.

If the SRS transmission uses only one antenna of the UE, for CC2 to perform MIMO transmissions in DL, more transmissions may be triggered (such as by one trigger). However, the interference at the UE may not be known to the network using this method. It may be used in conjunction with other methods that can provide interference measurements to the network, and the network can choose the transmission format based on the SRS and reported interference.

Figure 9:
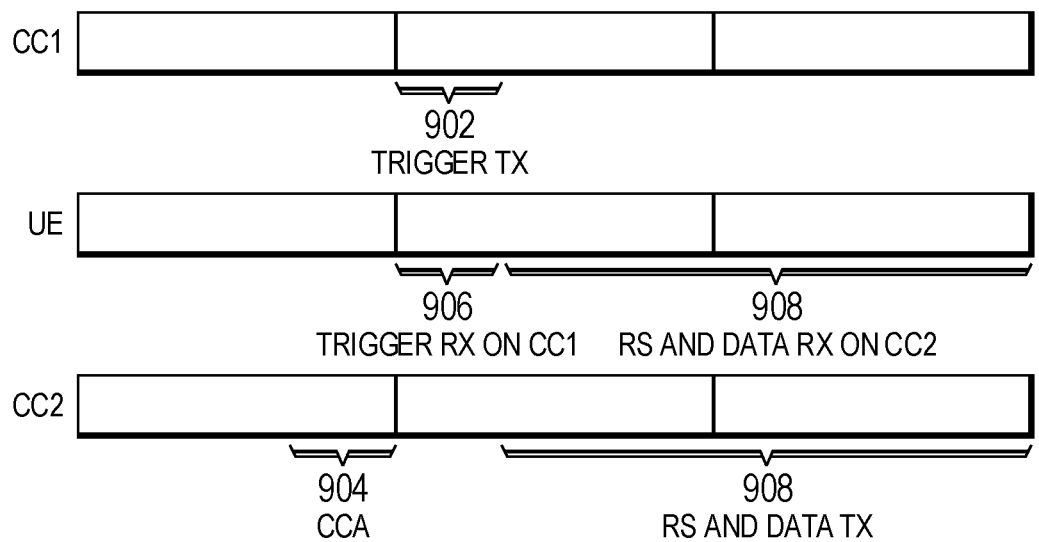
FIG. 9 shows an embodiment design of CSI measurement/feedback on demand for link adaptation, operating in U-LTE.

FIG. 9 shows an embodiment design of CSI measurement/feedback on demand for link adaptation, operating in U-LTE. It is assumed that CC1 is a cellular cell that the UE is monitoring, and CC2 is an opportunistically on/off cell operating on unlicensed carrier and has fast backhaul with CC1 (e.g., CC1 and CC2 are collocated). There is generally no DL RS for CSI measurements and reporting sent by CC2 when it is not selected. Besides, CC2 cannot transmit until it senses no transmission on that unlicensed carrier for a period of time; i.e., CC2 has to perform clear channel assessment 904 (CCA) before using the channel.

To support transmission on CC2, first CC2 may perform CCA 904 in the last few OFDM symbols of a subframe. If the channel is clear, then CC1 may transmit an aperiodic CSI trigger 902 for CC2; otherwise CC2 may repeat the CCA for a consecutive number of subframes. Generally, the trigger 902 is transmitted by CC1 in its PDCCH in the subframe following a successful CCA, and then the UE may detect and decode that trigger 906 in at most a few symbol durations. Then starting from symbol x in that subframe which is no earlier than the end of the trigger, CC2 may start RS transmission 908. Upon receiving the trigger, the UE starts monitoring CC2 (and possibly data). An aperiodic CSI report may be generated and sent to the network (e.g. CC1). With the CSI report, CC2 can perform link adaptation for its transmissions accordingly. In an embodiment CC2 may need to reserve the channel after CCA. CC2 may also perform CCA until the first few symbols of the subframe that the trigger is sent, and transmit RS immediately after the CCA. The trigger may be alternatively transmitted in CC1's EPDCCH, which occupies last symbols of a subframe but normally not the first few symbols. In this case the CCA and the EPDCCH containing the trigger may be done in one subframe. Then the RS/data transmission can only start from in the subframe after the EPDCCH. To make sure that the UE has time to detect and decode EPDCCH and prepare for monitoring CC2, the RS/data transmission should avoid the first few OFDM symbols of that subframe. CSI-RS may be a suitable candidate for the DL RS. Alternatively, if CRS is to be used, it may be transmitted only in the second slot in that subframe.

Figure 10:
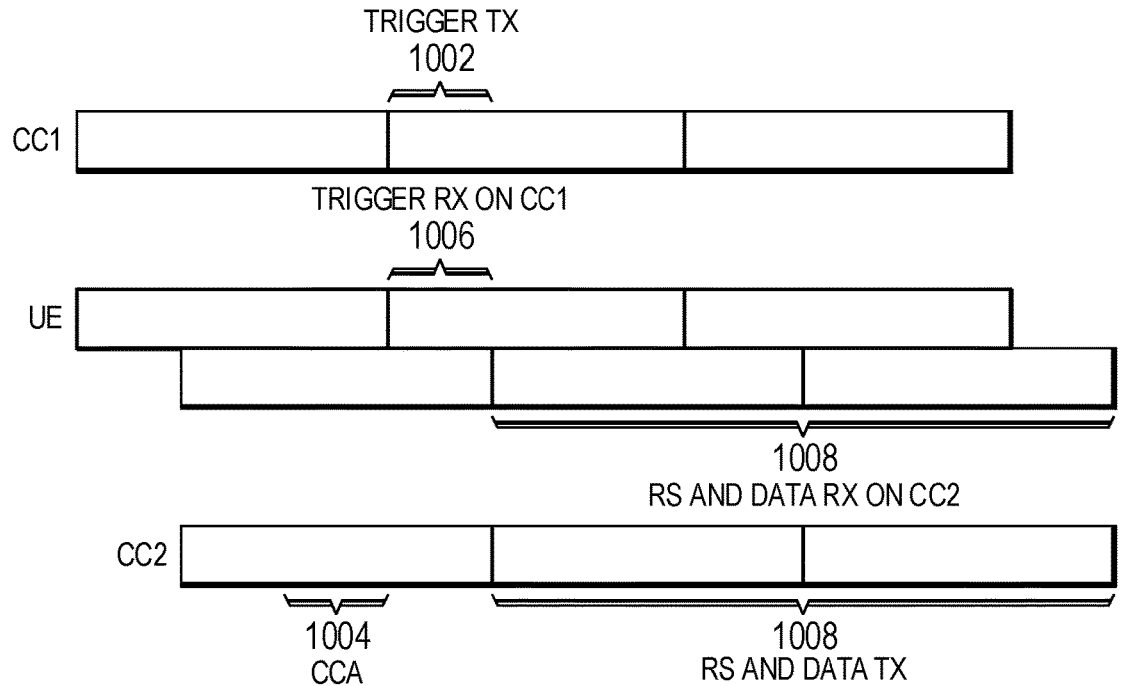
FIG. 10 shows an embodiment design of CSI measurement/feedback on demand for link adaptation in U-LTE, based on aperiodic SRS trigger and UL SRS to CC2.

Note that the RS and possible data transmission may not occur in the first few symbols of the subframe of CC2. In other words, every time CC2 starts this procedure, a few symbols may be lost. If such opportunistic transmissions occur frequently and each transmission is not long, the overhead may be high. Alternatively, CC2 may be time-shifted from CC1, as shown in FIG. 10. For simplicity, the shift may be a slot, but it can be other durations such as one or more OFDM symbol durations. Then RS and possibly data can be sent in the subframe by CC2 immediately after the trigger is sent. The UE receives the trigger from CC1 (based on CC1 subframe timing), and it starts to buffer the subframe of CC2 immediately after that for RS and possibly data. The licensed carriers may have the same subframe boundaries (subject to allowable timing errors), and the unlicensed carriers use the licensed as reference timing, but with a (possibly common) shift of the subframe boundaries. Therefore, at the cost that the network and UE maintain two timings (though related), the unlicensed subframes can be fully utilized.

FIG. 10 shows an embodiment design of CSI measurement/feedback on demand for link adaptation in U-LTE, based on aperiodic SRS trigger and UL SRS to CC2. Generally the UL transmissions are scheduled by the network, and the time/frequency resource to be used by the UL transmission is decided and specified by the network. However, in the unlicensed spectrum, the UE still needs to sense the channel and then decides if it can transmit or not. At least two alternatives may be adopted to deal with this issue. One is to allow some timing uncertainties in transmitting a scheduled UL, thus allowing the UE to back off a few symbols/slots/subframes before it times out. The other is that both the network node and UE should sense and reserve the channel before the scheduled transmission. These embodiments are described below.

In an embodiment, CC2 performs CCA 1004 at the last few symbols of a subframe, deciding if UL and/or DL transmissions are suitable or not. If yes, then CC1 sends SRS trigger 1002 in PDCCH in the next subframe. The UE then performs CCA upon receiving the SRS trigger 1006, and sends SRS in the last symbol(s) of the subframe (the last part of the subframe may be viewed as UpPTS for SRS transmission). Then data and/or DL RS from CC2 1008 may follow in the next subframe.

Figure 11:
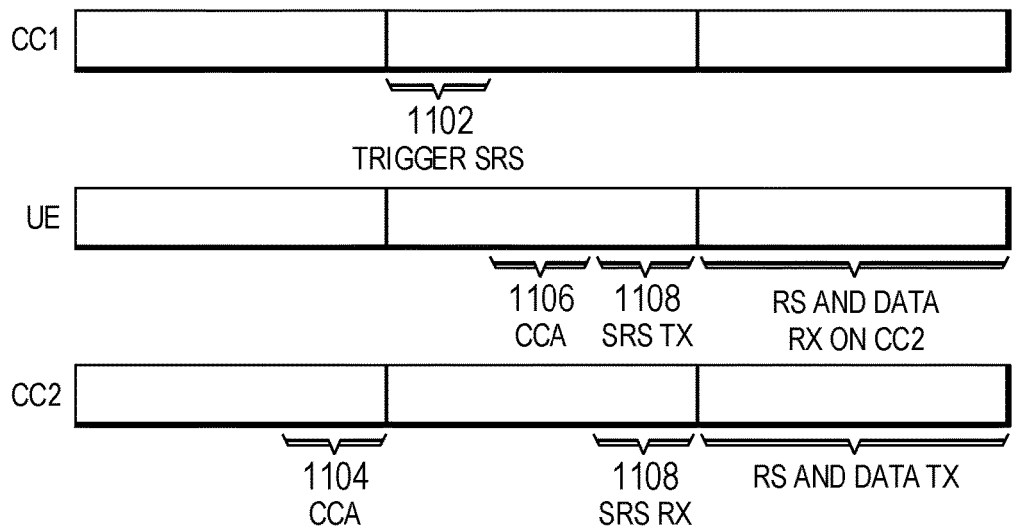
FIG. 11 shows another embodiment design of CSI measurement/feedback on demand for link adaptation in U-LTE, based on aperiodic SRS trigger and UL SRS to CC2.

FIG. 11 shows another embodiment design of CSI measurement/feedback on demand for link adaptation in U-LTE, based on aperiodic SRS trigger and UL SRS to CC2. As shown in FIG. 11, the UE may also treat the SRS trigger 1102 as a signaling requesting it to start monitoring CC2 in the next subframe. In another embodiment, CC2 performs CCA 1104 and sends EPDCCH in a subframe, and the UE performs CCA 1106 and sends SRS 1108 in the next subframe. In another embodiment, CC2's subframe boundaries may be shifted related to CC1's subframe boundaries, for example, by one slot.

In an embodiment, the RTS/CTS signals may also be transmitted similar to Wi-Fi. However, in U-LTE, the RTS/CTS mechanism does not need to be followed exactly. For example, even for the UL transmission, the network node CC2 may send RTS, and the UE may reply with CTS or the UE does not need to reply with CTS (just sending the UL without CTS). The signal contents/waveforms may also be altered from RTS/CTS, for example, the SRS may be viewed as a form of CTS in response to CC2's RTS. The RTS/CTS may also be used for U-LTE to transmit information, for example, they may contain scheduling and transmission information for SRS/CSI. The RTS may also be used to trigger UL transmissions.

In an embodiment, the DL RS may be enhanced to better suit the dynamic on/off schemes. For DRS generally used for RRM measurements, in systems like U-LTE systems, they may not be able to transmit periodically, depending on if an opportunity exists or not. One way to resolve this issue is to use trigger-based DRS transmission, measurement, and/or reporting. In other words, a DRS may be sent only after the eNB seizes a transmission opportunity, and the eNB can notify the UE to perform the measurement. In this case, the network may provide another indicator of whether the UE should also report the RRM measurements for this triggering instance.

Some signals included in the DRS burst may also be used for CSI measurements, tracking, etc. Nevertheless, it may still happen that when a Scell is turning on, only outdated CSI is available. An enhanced RS for CSI measurements may be used. The RS may occur as early as possible with the first subframe after the trigger. The RS may be transmitted in full power. The RS may occupy the entire bandwidth. Proper muting/orthogonalization may be used to improve the RS's SINR, such as PDSCH muting for CRS, zero-power CSI-RS for non-zero-power CSI-RS, cyclic shift for different cells on overlapped resource elements. One example is the cyclic-shifted enhanced CSI-RS, on the first symbols of the subframe. Such enhanced RS can significantly boost CSI measurement accuracy and tracking performance. With such enhanced RS, the density of the RS in time-domain does not have to be very high to ensure reliable CSI measurements. To allow for interference measurements, IMR may also be configured on the first symbols of a subframe, such as CSI-IMR or cyclic shift based IMR. Such enhanced RS may not need to appear in every data-carrying subframe, but at least for the initial subframe(s) after the turning on they can be transmitted. They can also be periodic after the turning on until the turning off.

Even with the enhanced RS, at the first few subframes after the turning on, no up-to-date or accurate CSI may be available. The network may rely on conservative scheduling and transmissions, such as conservative MCS and transmission schemes (such as open-loop MIMO, transmitter diversity). The MCS and transmission schemes may be updated after more reliable CSI is available, such as closed-loop MIMO or MU-MIMO. The change of transmission modes, if needed, may be indicated in DCI or specified as a fixed delay associated with the CSI availability delay (e.g. 5 ms).

The network nodes on the unlicensed carriers may need to monitor the channel usage regularly, and UEs may be configured for this as well. For these purposes, these cells may not transmit anything on some time/frequency resources. For the cells controlled by the same operator, they may mute at the same time (wideband on all channels, usually aligned with Wi-Fi channels), and no UE should transmit. This may be done periodically. A blank subframe pattern may be used, or a smaller time granularity may be used, such as slots/symbols, or a mixture of these. Existing blanking patterns such as those defined for eICIC (enhanced intercell interference coordination) may be reused (and the signaling mechanism as well), but instead of an almost blank subframe (ABS), a blank subframe is used. The cells sense in the muting duration, and they may sense transmissions by other U-LTE systems or Wi-Fi systems. The statistics are recorded and used by the network to coordinate resource allocation/avoidance in U-LTE systems and to access the interactions with Wi-Fi systems.

Thus, to support intra-RAT coordination among U-LTE systems, the transmission should contain sufficient information for a system to determine which system/RAT is transmitting, which may be done by attempting to detect and decode the preambles of Wi-Fi transmissions. If the transmission is not Wi-Fi (i.e., no Wi-Fi preamble is detected), then the system may know if it is another U-LTE system by examining the waveforms or exchanging information with other systems over backhaul. In addition, a subset of UEs may be configured to sense on the interference measurement resources (IMRs) designed and configured for these purposes. Different from Rel-11 IMRs, these IMRs occupy the full bandwidth of a channel for inter-RAT sensing (but for intra-RAT sensing, with proper coordination, IMR not necessarily occupying wideband as defined now may be used, but the interference on the IMR may be reported separately from CSI reporting). CSI-IMR occupying the entire $9^{th}$ and $10^{th}$ symbols may be used for measurements, and/or measurements on specified blanking subframes may also be used. The IMRs may or may not be associated with any CSI processes, and the measurement may be similar to RSSI defined in Rel-11 or Rel-12.

With the sensing statistics, the network can estimate long-term (at least seconds) traffic loads and channel usage on unlicensed carriers. The network can then opportunistically avoid certain crowded channels and choose more favorable channels. The network may also intentionally avoid using some channels even if those channels are less crowded; instead, via spectrum sensing, Wi-Fi APs may move to those channels. A possible result is Wi-Fi uses a few channels and U-LTE uses other channels. This seems desirable since the U-LTE operations can be efficient without constantly concerning the random access made by Wi-Fi, and UL transmissions can be supported by U-LTE, i.e., there may not be a need for CCA before each transmission. Wi-Fi can also work efficiently with co-existence issues with dense cellular. The LTE system still monitors the entire bandwidth of the unlicensed spectrum and may adjust its occupancy of the channels based on relative loads and channel usages on all the channels. The LTE system may predict possible equilibrium states of the channel usages and find a desirable one for both LTE and Wi-Fi, and steer RATs and traffic to the desired equilibrium state.

Some signals included in the DRS burst may also be used for CSI measurements, tracking, etc. Nevertheless, it may still happen that when a Scell is turning on, only outdated CSI is available. An enhanced RS for CSI measurements may be used. The RS may occur as early as possible with the first subframe after the trigger. The RS may be transmitted in full power. The RS may occupy the entire bandwidth. Proper muting/orthogonalization may be used to improve the RS's SINR, such as PDSCH muting for CRS, zero-power CSI-RS for non-zero-power CSI-RS, cyclic shift for different cells on overlapped REs. One example is the cyclic-shifted enhanced CSI-RS, on the first symbols of the subframe. Such enhanced RS can significantly boost CSI measurement accuracy and tracking performance. This enhanced RS will be further discussed later. With such enhanced RS, the density of the RS in time-domain does not have to be very high to ensure reliable CSI measurements. To allow for interference measurements, IMR may also be configured on the first symbols of a subframe, such as CSI-IMR or cyclic shift based IMR. Such enhanced RS may not need to appear in every data-carrying subframe, but at least for the initial subframe(s) after the turning on they can be transmitted. They can also be periodic after the turning on but before the turning off.

Even with the enhanced RS, at the first few subframes after the turning on, no up-to-date or accurate CSI may be available. The network may rely on conservative scheduling and transmissions, such as conservative MCS and transmission schemes (such as open-loop MIMO, transmitter diversity). The MCS and transmission schemes may be updated after more reliable CSI is available, such as closed-loop MIMO or MU-MIMO. The change of transmission modes, if needed, may be indicated in DCI or specified as a fixed delay associated with the CSI availability delay (e.g. 5 ms).

The network nodes on the unlicensed carriers may need to monitor the channel usage regularly, and UEs may be configured for this as well. For these purposes, these cells may not transmit anything on some time/frequency resources. For the cells controlled by the same operator, they may mute at the same time (wideband on all channels, usually aligned with Wi-Fi channels), and no UE should transmit. This may be done periodically. A blank subframe pattern may be used, or a smaller time granularity may be used, such as slots/symbols, or a mixture of these. Existing blanking patterns such as those defined for eICIC may be reused (and the signaling mechanism as well), but instead of an almost blank subframe (ABS), a blank subframe is used. The cells sense in the muting duration, and they may sense transmissions by other U-LTE systems or Wi-Fi systems. The statistics are recorded and used by the network to coordinate resource allocation/avoidance in U-LTE systems and to access the interactions with Wi-Fi systems.

Thus, to support intra-RAT coordination among U-LTE systems, the transmission should contain sufficient information for a system to determine which system/RAT is transmitting, which may be done by attempting to detect and decode the preambles of Wi-Fi transmissions. If the transmission is not Wi-Fi (i.e., no Wi-Fi preamble is detected), then the system may know if it is another U-LTE system by examining the waveforms or exchanging information with other systems over backhaul. In addition, a subset of UEs may be configured to sense on the interference measurement resources (IMRs) designed and configured for these purposes. Different from Rel-11 IMRs, these IMRs occupy the full bandwidth of a channel for inter-RAT sensing (but for intra-RAT sensing, with proper coordination, IMR not necessarily occupying wideband as defined now may be used, but the interference on the IMR may be reported separately from CSI reporting). CSI-IMR occupying the entire $9^{th}$ and $10^{th}$ symbols may be used for measurements, and/or measurements on specified blanking subframes may also be used. The IMRs may or may not be associated with any CSI processes, and the measurement may be similar to RSSI defined in Rel-11 or Rel-12.

With the sensing statistics, the network can estimate long-term (at least seconds) traffic loads and channel usage on unlicensed carriers. The network can then opportunistically avoid certain crowded channels and choose more favorable channels. The network may also intentionally avoid using some channels even if those channels are less crowded; instead, via spectrum sensing, Wi-Fi APs may move to those channels. A possible result is Wi-Fi uses a few channels and U-LTE uses other channels. This seems desirable since the U-LTE operations can be efficient without constantly concerning the random access made by Wi-Fi, and UL transmissions can be supported by U-LTE, i.e., there may not be a need for CCA before each transmission. Wi-Fi can also work efficiently with co-existence issues with dense cellular. The LTE system still monitors the entire bandwidth of the unlicensed spectrum and may adjust its occupancy of the channels based on relative loads and channel usages on all the channels. The LTE system may predict possible equilibrium states of the channel usages and find a desirable one for both LTE and Wi-Fi, and steer RATs and traffic to the desired equilibrium state.

As we have seen, to support dynamic on/off of carriers in licensed or unlicensed spectrum, in low-frequency or in high-frequency, or to support LTE-like system in unlicensed spectrum, enhanced RS and associated new UE behavior are critical. Further discussions will be provided here.

Figure 12:
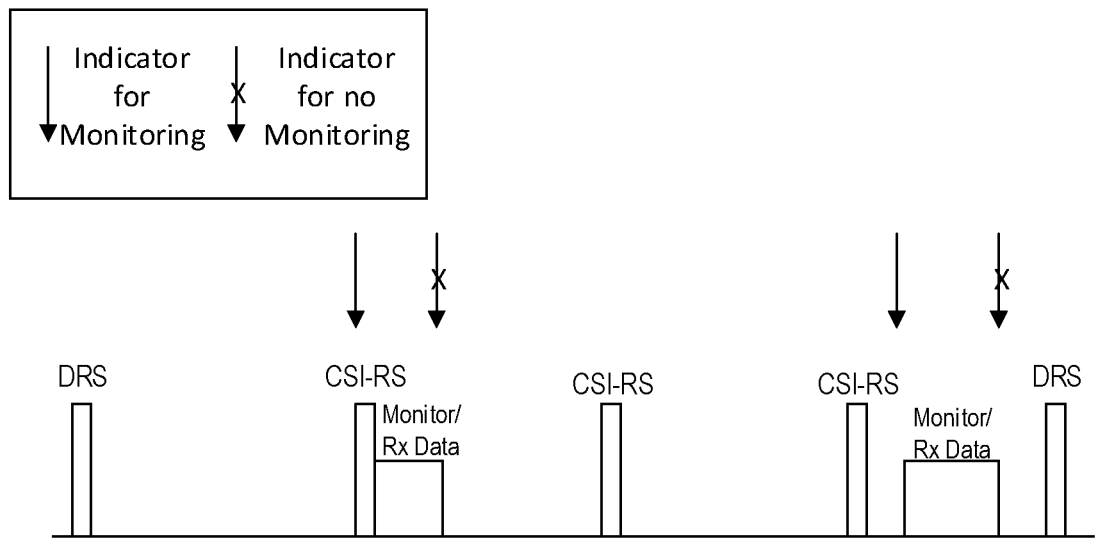
FIG. 12 shows an example of an embodiment L1 procedure.

FIG. 12 shows an example of an embodiment L1 procedure. The UE does not monitor the activated Scell except for subframes containing DRS or periodic CSI-RS or periodic CRS (whose presence and periodicity are configurable), unless it receives an indicator for starting monitoring of the Scell. After the UE receives the signaling, it starts monitoring for (E)PDCCH and may receive data for a number of subframes. Finally, the UE stops monitoring the Scell after it receives an indicator for stopping monitoring of the Scell.

To support small cell off-to-on transition at any subframe with low UE complexity and high reliability, the S cell off-to-on indicator should be sent from the Pcell which the UE always monitors. For the case of Scell on-to-off transition, some kind of implicit indication may be possible. For example, the stop-monitoring indicator may be implicit based on the absence of (E)PDCCH for a certain amount of time. However, in some cases, it may be simple and beneficial to have a unified solution for off-to-on and on-to-off indication. Therefore it may be considered to also use explicit DCI message for both Scell off-to-on and Scell on-to-off indication, such as an indication bit is used. When the indication bit is set for the Scell, then it indicates the Scell is turning on; otherwise the Scell is turning off. A bitmap can be formed and sent from the Pcell to indicate the state transitions of multiple Scells, and the mapping between the bits and the Scells can be predefined in RRC signaling. One more bit can be added for each Scell if needed, such as to indicate the state changes of the Scell in addition to directly indicating the on/off state. This may be needed since for the same Scell, UEs attached to it may have different states (monitoring or not monitoring). Only transmitting the on/off state of the Scell will force the UEs to start or stop monitoring upon receiving the indicator, but in some cases this is not desired if the network just wants the UEs to maintain their current states. For example, bit 1 is used to indicate if the UEs should keep their current states or update according to bit 2, and bit is used to indicate the on/off. Alternatively, the Scell identifier may be carried with the indicator. For example, the eNB may indicate with one or two bits that Scell 1 is turning on, turning off, or UE should keep or flip their current states. Another embodiment is just to indicate if the states need to be flipped or kept without indicating the on/off states; however this may have the drawback that if a UE misses one indicator, it may not work correctly afterward. For example, the eNB may indicate with one bit of whether the UEs should keep or flip their current states. To summarize, various embodiments can be provided to signal the possible states: turning on versus turning off, and flipping the current states versus maintaining the current states. One or more of the states may be indicated.

With the above design, the UE starts monitoring the Scell's RS/(E)PDCCH upon receiving the On-state indication from the Pcell, and it stops monitoring the Scell upon receiving the Off-state indication from the Pcell. In other words, the On/Off state indicators serve as the monitoring indicator and no-monitoring indicator for the UE. (Note that, however, the subframes with configured DRS/CSI-RS are always monitored by the UE.)

Figure 13:
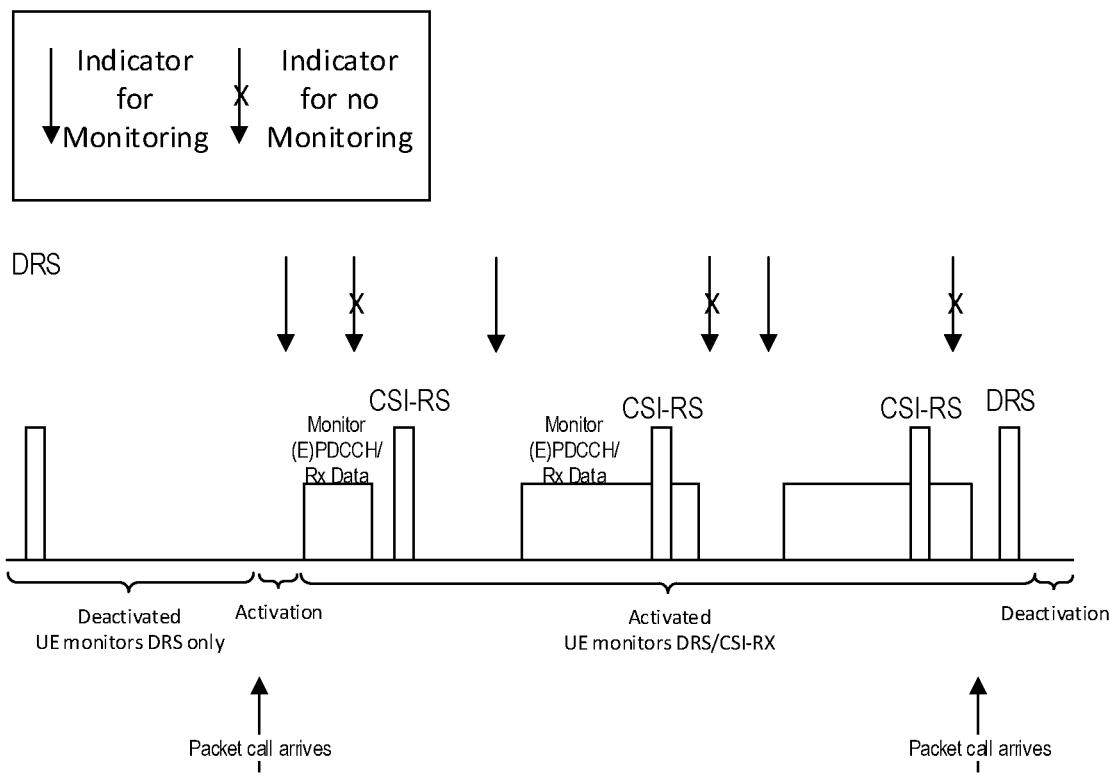
FIG. 13 shows one embodiment of the procedure and illustrates UE monitoring behavior.

FIG. 13 shows one embodiment of the procedure and illustrates UE monitoring behavior. Note that the monitoring/no-monitoring indicators may be explicit or implicit. An embodiment of the no-monitoring indicator may be based on a timer of inactivity. Another embodiment of the indicators may be based on DRX configuration, i.e., when the UE enters the DRX, it stops monitoring, and when it enters On-period and in active time of the DRX cycle, it monitors the carrier. The DRX based embodiment and non-DRX based embodiment may be combined. In the monitoring period, UE may receive PDSCH based on self or cross-carrier (E)PDCCH scheduling. In the subframe scheduled by (E)PDCCH, UE assumes PDSCH and CRS/enhanced RS (see FIGS. 14A-14I and related discussion below). In other subframes of the monitoring period, in one design, CRS may still be present for backward compatibility, but in another design, CRS may not be present (i.e., the carrier acts as a new carrier type) in all non-PDSCH subframe or in all non-PDSCH/CSI-RS subframes. In the no-monitoring period, the UE assumes only DRS and CSI-RS on the configured subframes, respectively. However, on the CSI-RS subframes, CRS may still be present for backward compatibility or not present as a new carrier type. Other than these, no transmissions should be assumed during the no-monitoring period.

The UE may start monitoring the Scell's RS/(E)PDCCH on the subframe where it receives the off-to-on indicator in DCI. There can be a brief transition time needed for the UE to receive from the Scell. In the cases with synchronized carriers and periodic DRS/CSI-RS transmissions, no time is needed for tracking, RF tuning, or AGC settling. However, one OFDM symbol duration may be needed for the indicator detection. That is, the UE may receive from the Scell starting from the 3rd OFDM symbol of the first subframe of the transition. On the other hand, if the UE is not synchronized with the Scell, and/or RF tuning and AGC settling is needed, it needs to receive some signals (e.g. CRS/PSS/etc.) from the Scell for some longer duration before it can decode (E)PDCCH or receive data.

An embodiment is that the frame structure is designed based on 2 OFDM symbol duration for transition, and the Scell subframe boundary is aligned with the Pcell subframe boundary. That is, the DCI is transmitted on the Pcell on the first OFDM symbol, and the UE detection/decoding of the DCI takes up to one OFDM symbol duration. No other transition time is needed. Then the Scell transmission can start on the $3^{rd}$ OFDM symbol. Though PDCCH cannot be transmitted on this Scell subframe, EPDCCH can. Before the $3^{rd}$ symbol, for REs not scheduled with any transmission according to legacy standards, the Scell can transmitted anything, which may be used for fine synchronization, RF tuning/retuning and AGC settling if needed.

An embodiment is that the frame structure is designed based on 3 OFDM symbol duration for transition, and the Scell subframe boundary is aligned with the Pcell subframe boundary. That is, the DCI is transmitted on the Pcell on the first OFDM symbol, and the UE detection/decoding of the DCI takes one OFDM symbol duration, and then the Scell transmits signals (but not data) on the $3^{rd}$ symbol. Data is transmitted from the $4^{th}$ symbol, and the control information can only come from other cells (e.g. Pcell). The signals transmitted by the Scell on the $3^{rd}$ symbol can contain RS if fine synchronization is needed, and any signal if RF tuning/retuning and AGC settling is needed.

An embodiment is that the frame structure is designed based on 5 OFDM symbol duration for transition, and the Scell subframe boundary is aligned with the Pcell subframe boundary. That is, the DCI is transmitted on the Pcell on the $1^{st}$ and possibly $2^{nd}/3^{rd}$ OFDM symbols, and the UE detection/decoding of the DCI takes one OFDM symbol duration, and then the Scell transmits CRS on the $5^{th}$ symbol, as transmitted according to legacy standards. Data is transmitted from the $6^{th}$ or even $7^{th}$ symbol, and the control information can only come from other cells (e.g. Pcell). Before the $6^{th}$ symbol, for REs not scheduled with any transmission according to legacy standards, the Scell can transmitted anything, which may be used for fine synchronization, RF tuning/retuning and AGC settling if needed.

An embodiment requires the UE to monitor each subframe after the Scell is activated. Therefore, the UE buffers each Scell subframe (but no further operation/processing is needed until Pcell DCI detection result is available) while it attempts to decode the Pcell DCI. If the Pcell DCI for the Scell to be turned on is not detected, the buffered subframe is discarded; otherwise the subframe is further processed and every symbol can be used for data transmission.

An embodiment shifts the Scell subframe boundary so that it lags the Pcell subframe boundary for a fixed amount of time. The offset can be chosen as the maximum transition time. For example, if one symbol is needed for DCI transmission, one for DCI detection, and one for AGC settling, then 3 symbol offset can be applied. Note that although the Scell subframe starts 3 symbols later than the Pcell, the Scell can transmit signals (e.g. RS for AGC settling) one subframe before the Scell subframe boundary, i.e., the symbol right after the UE completes DCI detection. The UE needs to start receiving right after the DCI is detected and receives the last symbol of the subframe from the Scell. Then when the next subframe of the Scell starts, the UE can have its AGC (or timing, or RF, etc.) correctly set, and the next subframe is a complete subframe with (E)PDCCH/RS/etc. The fixed offset in terms of the number of OFDM symbols should be sent to the UE in RRC signaling or system information when the Scell is added to the UE. The UE shall apply the offset for any cross-carrier indication if the two carriers are configured with such an offset. In one embodiment, the cells on each layer have aligned subframe boundaries, but the small cell layers (capacity layers, U-LTE layers, etc.) is lagging the macro layer (coverage layer) by a fixed offset.

Considering the scope of new L1 procedure for small cell on/off is mainly limited to the physical layer design, it is better that the Scell on/off indication is transmitted through DCI message on the Pcell which is assumed always on. In addition, when a small cell configured as a Scell is turning on or off, the cell state information may need to be sent to multiple UEs having this cell in their configured Scell list. Therefore, the Scell on/off state indication may be sent to a group of UEs using new DCI message. DCI format 1C may be reused or modified for this purpose. Group RNTI (radio network temporary identifier) or an RNTI common to all UEs in the cell may be used, such as SI-RNTI or P-RNTI. The DCI may be monitored by the UE on Pcell on every DL subframe. The DCI may also be combined with aperiodic CSI request to trigger UE reports of CSI measurements. For example, if the DCI indicates that the cell is on or the UE needs to monitor the cell, then the UE sends its aperiodic CSI report on the Pcell's (or another Scell's) specified resources. The DCI may also be combined with an eIMTA (Enhanced Interference Mitigation & Traffic Adaptation) dynamic TDD configuration indicator.

An alternative is to use implicit indicator. In this case, the Pcell does not send any explicit indicator regarding the on/off state. The UE monitors every subframe, and detects if there is RS and/or (E)PDCCH for it on this Scell. There may be cases where RS is detected but no (E)PDCCH for this UE is detected, and the UE can update its measurements (CSI measurements and/or RRM measurements), and also the RS can help the UE with time/frequency tracking and AGC. There may be cases where (E)PDCCH for this UE is detected but no RS is detected except for DMRS used for demodulation, where the DMRS may be signaled to quasi-co-located with the RS detected elsewhere on the Scell (such RS may be part of the enhanced RS, which will be further discussed later) or a specified DRS. There may be cases where RS is detected and (E)PDCCH for this UE is detected, and the UE can update its measurements (CSI measurements and/or RRM measurements), the RS can help the UE with time/frequency tracking and AGC, and the RS may be used for demodulation of the PDCCH and possible the data.

For either the explicit indicator or the "implicit indicator", the network may further restrict on which subframes the indicator may be sent, thus reducing the UE's monitoring times. The cases with a FDD Pcell and TDD Scell, and FDD Pcell and TDD eIMTA Scell, and TDD Pcell/Scell, etc., may be considered. For example, the turning-on transition may only occur in subframe 0 (and subframe 5), and hence the indicator may be sent only on subframe 9 (and subframe 4). A longer delay between the indicator and the turning-on transition may also be used, such as 2 or 4 subframes. If the subframe after the delay is not a DL subframe, then the turning-on will occur on the first DL subframe after the delay.

It can be seen from the above example that, in addition to DRS, the standards impacts of new L1 procedure mainly include defining the explicit DCI message to support Scell on/off and the associated UE monitoring behaviors.

FIGS. 14A-14I illustrate embodiments of subframes using enhanced reference signals in accordance with embodiments of the present invention. In an embodiment, an enhanced RS (eRS) may occupy the majority or, in a particularly effective embodiment, the entire bandwidth of a component carrier as shown in subframe 1410 of FIG. 14A. The RS may be located at the first OFDM symbol of the subframe. The RS may be transmitted with high power and high density in the frequency domain. In accordance with an embodiment, the RS-bearing subframe may be transmitted immediately when the carrier is turned on for transmission. Note that the turning on of a carrier may be from the UE perspective. The turning on of the carrier may be indicated by another carrier using cross-carrier scheduling method or other triggering method, such as aperiodic CSI report request. The turning on may also be indicated implicitly by UE autonomous detection. The RS should be designed to help the UE quickly perform time/frequency tracking, RF retuning, and AGC adjustment. Upon receiving the trigger, the UE will perform time/frequency tracking. For this purpose, the RS may occupy every RE of the first symbol of the subframe.

Figure 14A:
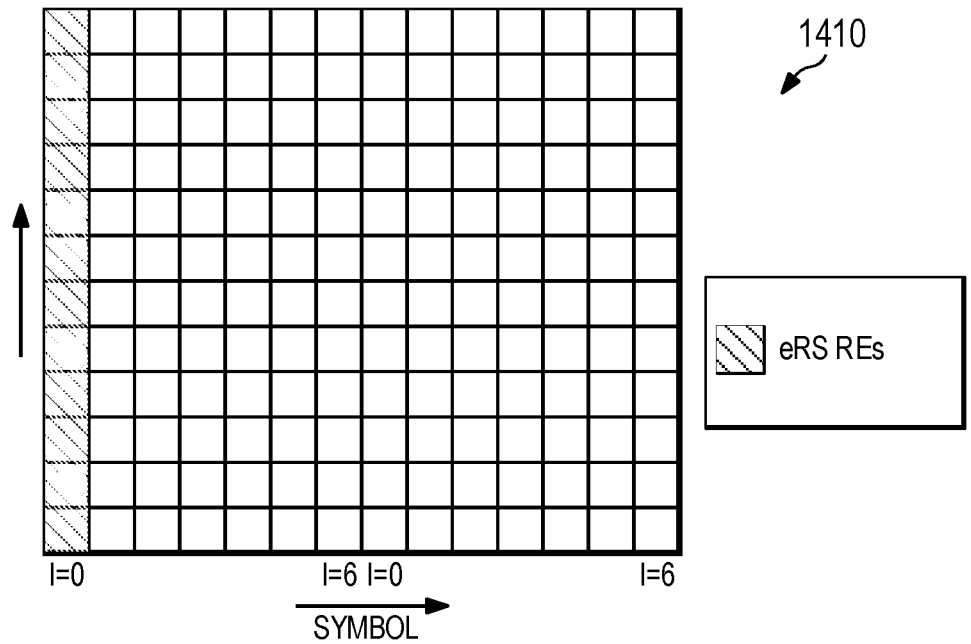
FIGS. 14A-14I illustrate embodiments of subframes using enhanced reference signals in accordance with embodiments of the present invention.
Figure 14B:
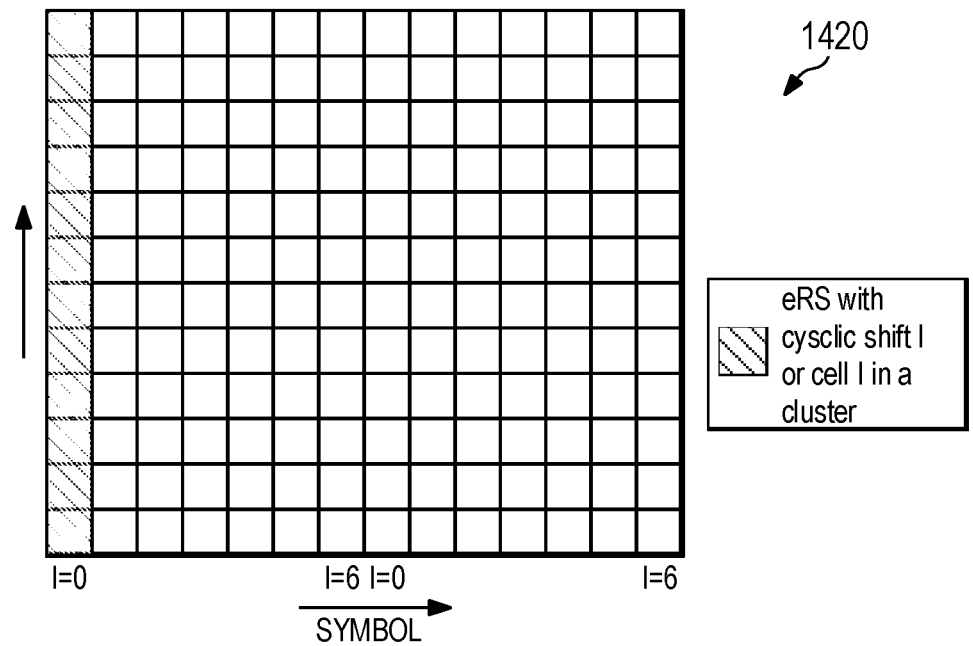
Figure 14C:
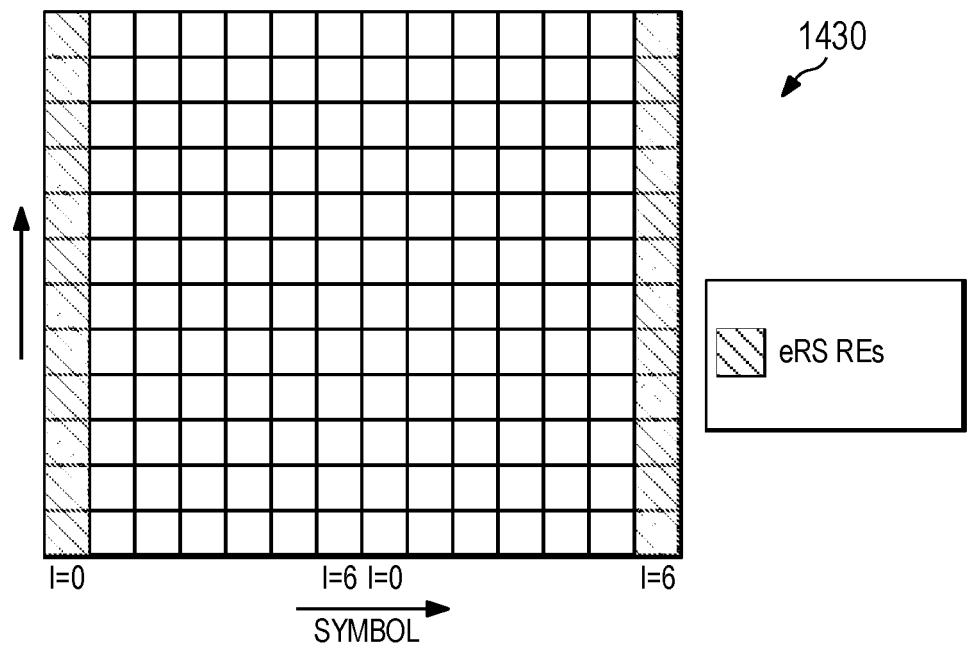
Figure 14D:
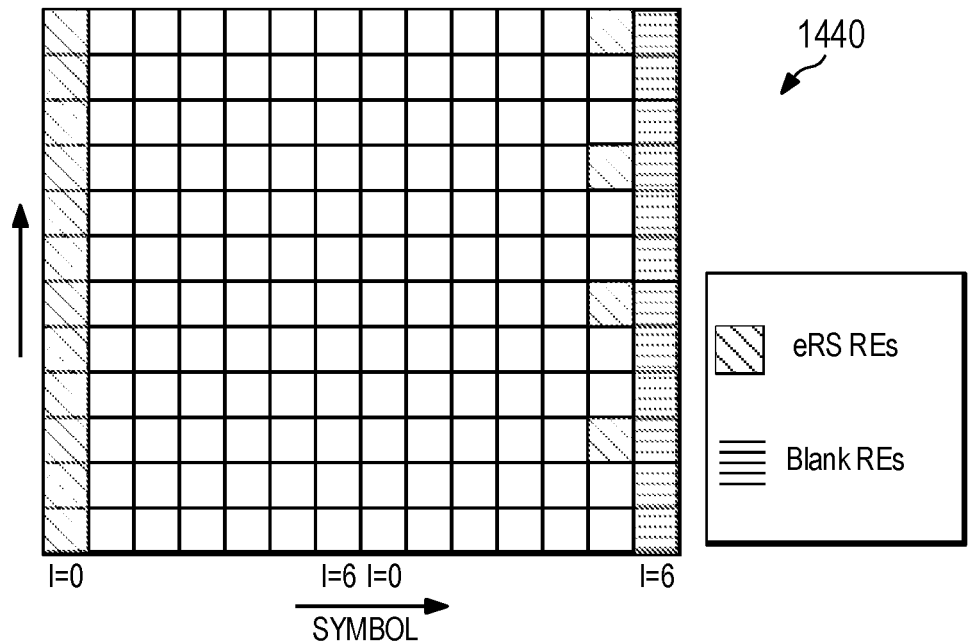
Figure 14E:
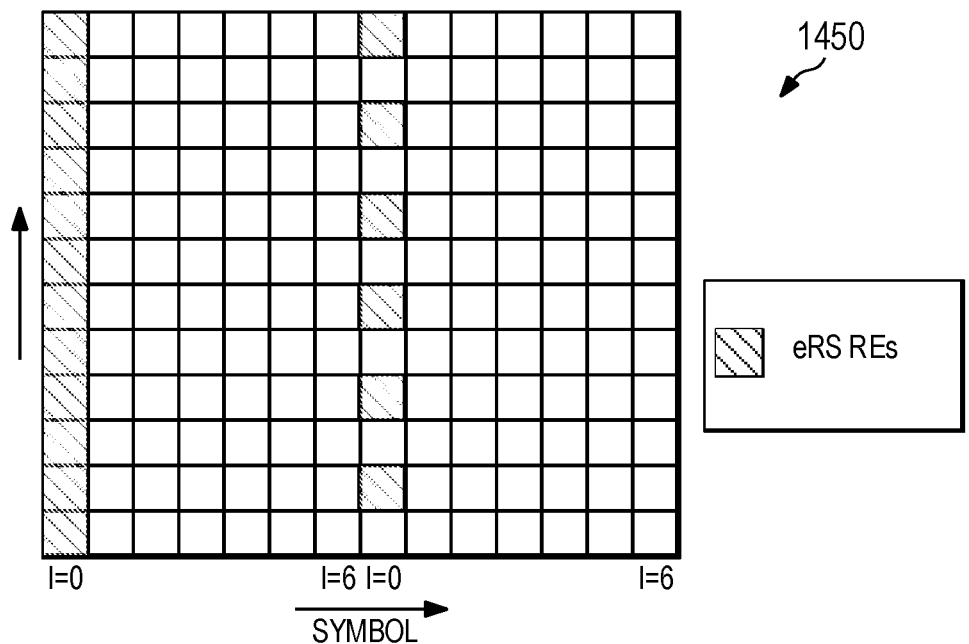
Figure 14F:
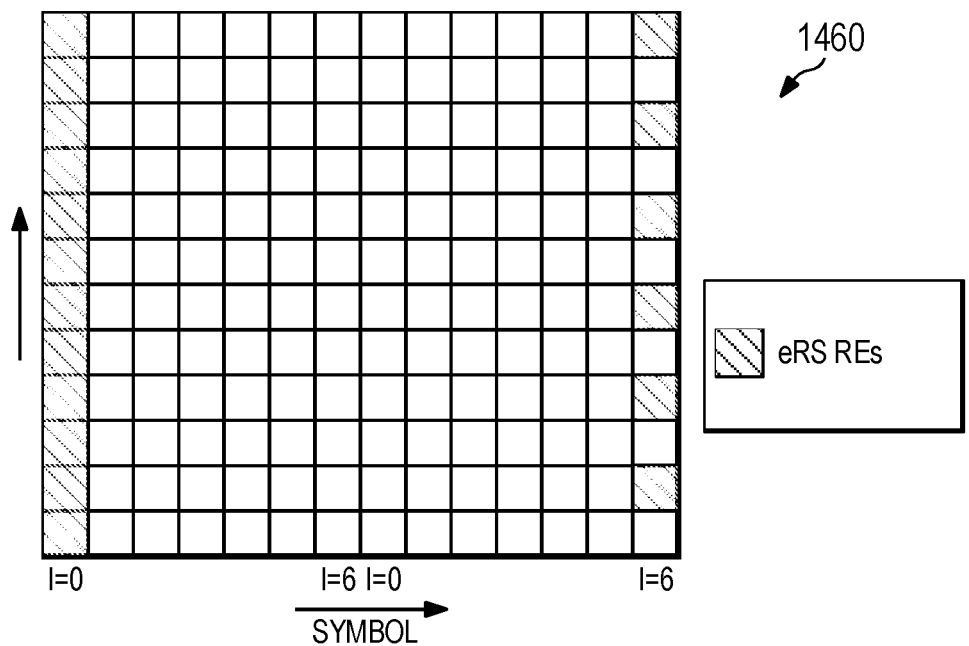

If reuse becomes a potential issue within a cluster of small cell or within neighboring small cells, the reuse may be done by applying different cyclic shifts from different cells and the cells can all transmit with the same scrambling sequence as in subframe 1420 of FIG. 14B, which is another example subframe using eRS. If the cells are tightly time synchronized, several or all the cells may transmit with one common cyclic shift on some REs so that their transmissions can be aggregated by the UE to better track the time. Note that on other REs and/or on all REs the cells may transmit their RS with their allocated cyclic shifts.

If the timing error between the carrier and the UE is not significant (e.g., within the cyclic prefix length), then the eRS may not need to carry any signal for synchronization, such as PSS or CRS to help the UE determine the FFT window; instead, it may be DMRS (or the like) which can be used by the UE for demodulation with suitable digital processing, or CSI-RS (or the like) which can be used for CSI feedback. A carrier with periodic PSS/CRS/DRS transmissions falls into this category, if the CRS/DRS periodicity is not too long. However, if the timing error between the carrier and the UE is larger than the CP length, a signal that can help the UE to determine the FFT window and achieve fine synchronization needs to be included in the eRS. The signal can be a PSS-like signal, or a CRS-like signal. In one embodiment, the signal can be a DRS, concentrated on the first few symbols of a subframe. In one embodiment, one or more PSS-like sequences can be present in the eRS symbol, or spread in more than one eRS symbol in one subframe, or spread in more than one eRS subframes (e.g., one PSS on the first symbol in one subframe for one group of UEs to achieve synchronization). A carrier without PSS/CRS/DRS transmissions for a long time falls into this category. For example, an unlicensed carrier without periodic DRS configured. For another example, an opportunistic licensed carrier without periodic DRS configured.

An embodiment to help the UE perform frequency tracking is to transmit enhanced RS in two OFDM symbols in a subframe. The farther apart the two symbols are, the better the frequency tracking performance. The first may be placed in the first symbol of the subframe. The second may be placed in the last useable symbol of the subframe. In case of licensed carrier it may be in the last of the subframe as in subframe 1430 of FIG. 14C. But in case of unlicensed carrier where the network/UE need to perform listening, the last symbol of the subframe may be used for listening, and the RS may be placed right before it as in subframe 1440 in FIG. 14D. By keeping the RS-bearing symbols far apart can yield good frequency tracking performance. However, if the frequency tracking accuracy can be satisfied with two RS-bearing symbols closer to each other, the second may be placed closer to the first so that the tracking can be sooner. For example, the second may be placed in the first OFDM symbol of the next slot as in subframe 1450 of FIG. 14E. Exactly where to place it can be derived by calculating the drifting rate based on requirements and off duration. The second symbol for eRS may not be solely occupied by eRS REs; some REs may be used for data transmission or other purposes such as subframe 1430 in FIG. 14C and/or subframe 1460 of FIG. 4D. These embodiments may be combined.

With the enhanced RS, a subframe may become self-contained. In other words, the subframe may not need to rely on other types of RS (e.g., CRS) in a different subframe for tracking and AGC adjustment and possibly demodulation. DRS may still be used once in a while, either periodically with low duty cycle, or aperiodically based on network triggering; and the DRS may provide coarse time/frequency tracking, RRM measurements, and AGC. Quasi-co-location relation between the DRS ports and the enhanced RS ports may be specified so that the UE can utilize tracking/measurement/AGC previously attained using DRS (or enhanced RS) for the enhanced RS (or DRS). The enhanced RS may also be placed in consecutive subframes, such as relying on the first OFDM symbols of the first and second subframes to complete the frequency tracking, but then the first subframe may not be fully self-contained.

Figure 14G:
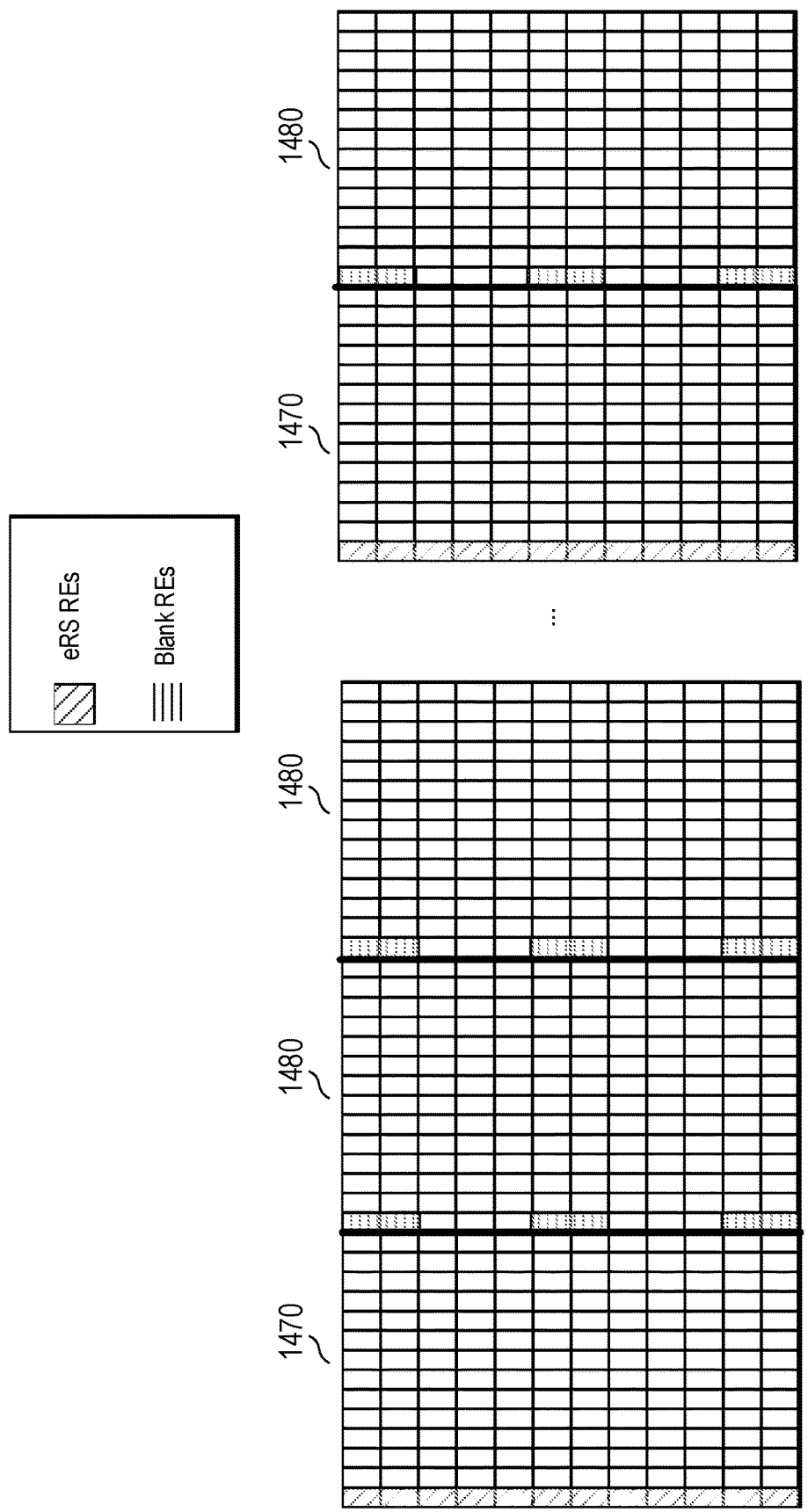

Such a self-contained subframe may not be needed for every data subframe. Especially such a subframe may have higher overhead. In addition, after the UE acquires tracking and AGC from a self-contained subframe, the UE can maintain tracking/AGC for at least several subframe durations and only DMRS may be needed for demodulation. Therefore, there may be more than one type of subframes: a self-contained subframe 1470 and dependent subframes 1480 as shown in FIG. 14G. The dependent subframe cannot standalone and it has to derive channel properties based on RS in another subframe using network-specified quasi-co-location relationship. The UE may assume every time the carrier is turning on, the first subframe is a self-contained subframe, and all later subframes are dependent subframe. However the later subframe may also be a self-contained subframe in order to maintain tracking performance. Then the occurrence of the self-contained subframes may be signaled as periodic (pre-configured, such as once every 5 or 10 ms) or aperiodic (by physical layer or MAC layer signaling). The occurrence of the self-contained subframes may also be left for UE autonomous detection. The example of FIG. 14G shows a configuration where the eRS for tracking is transmitted only once in a few subframes while the data subframes (dependent subframes) may not contain eRS. However, the eRS transmissions in later occurrences may not need to have frequency-domain density as high as the first occurrences, since the later occurrences is used only for very fine adjustments due to slow drifts.

The enhanced RS may also use some of its time/frequency/cyclic shift resources for MIMO support. For example, the cyclic shifts may be used to indicate channel conditions associated with different antenna ports from one cell. Therefore, on one RE a cell may transmit on more than one cyclic shift. The total transmission power may be split equally across the ports.

CSI measurements may be based on the enhanced RS upon receipt of the RS. The one-symbol enhanced RS may be sufficient for reasonable CSI measurement and the UE may report the measurement as soon as it can. If one-symbol enhanced RS is not sufficient, another symbol of enhanced RS may be added and it may be next to the first symbol, in order to shorten the latency.

Figure 14H:
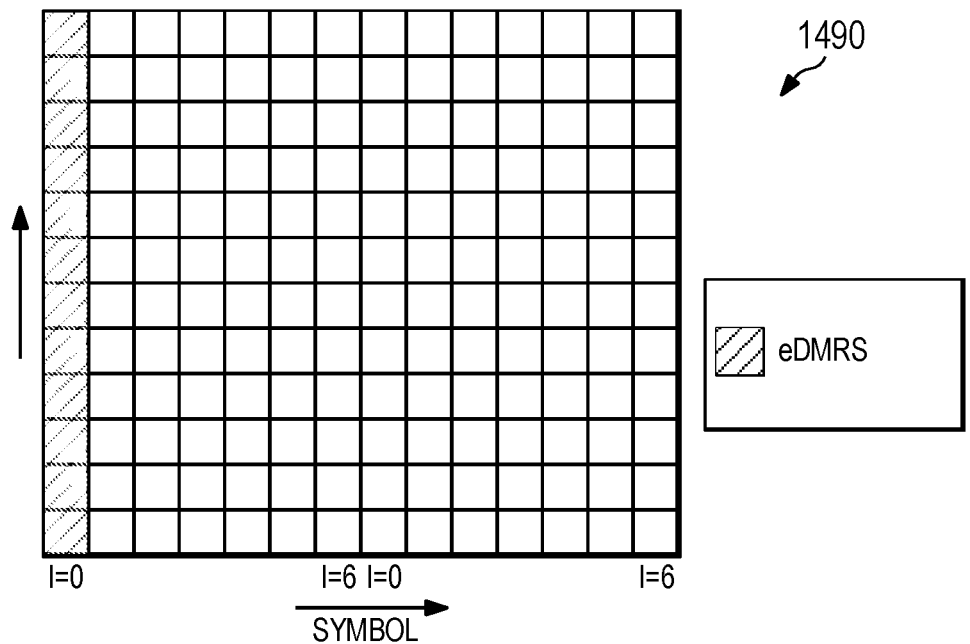
Figure 14I:
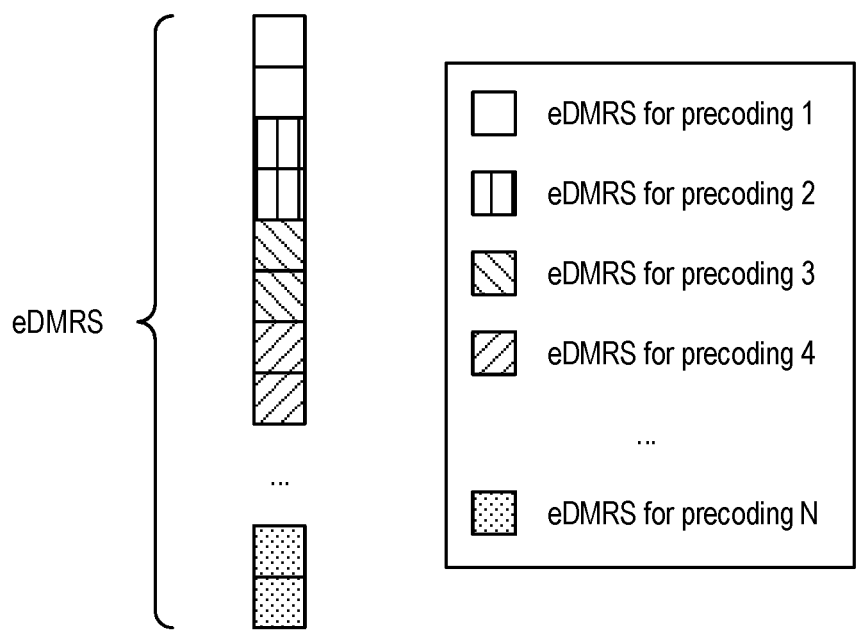

The scrambling sequence for the enhanced RS may be DMRS sequences, and such DMRS may be called eDMRS as in subframe 1490 of FIG. 14H. eRS may or may not be using DMRS sequences, and therefore, may or may not be part of the eDMRS. Precoding may be performed on part or all of the eDMRS. RS indicating higher ranks can also be designed. Such enhanced DMRS may contain several sections, where some may be used for tracking/AGC only and some others may be used for demodulation of PDSCH. For example, one some REs of the first OFDM symbol eRS may be present, while on other REs of the first OFDM symbol eDMRS may be present. Those eRS REs may be located in the center 6 RBs or on specific RBs. The eDMRS may be designed as UE specific or cell specific, in the latter case the network may signal the UE which DMRS it should use for demodulation. In some sense the DL RS design may resemble UL RS design. For example, a number of precodings may be applied to some eDMRS REs (see, e.g., FIG. 14I), and for the PDSCH in this subframe or next subframe (s), each PDSCH may be associated with a precoding index (e.g., 1, 2, 3, 4, . . . N), and the UE can use the associated eDMRS for demodulation. The precoding may be common in all subframes, which may have a limited number of predefined precoding vectors/matrices to cover certain beamforming directions (e.g., 12 precoding vectors/matrices in total to cover all possible directions). Therefore, the eDMRS may be indexed according to their precoding vectors/matrices and ranks, and the PDSCH scheduled by (E)PDCCH will be indicated with the eDMRS index which the UE will use for demodulation. The CSI measurements and feedback may also be based on these eDMRS and the UE reports the eDMRS index expected to maximize the data rate; that is, the UE does not need to estimate the data rates by hypothesizing precodings and ranks based on non-precoded RS, instead, it estimate the data rates by measuring a number of precoded RS. Alternatively, the precoding vectors/matrices may not be predefined and the UE should not assume from one subframe to another, the eDMRS remain unchanged. Precoding may also be applied to other eRS, such as precoded CRS, precoded CSI-RS, precoded DRS, etc. How they may be used in the system may be similar to above eDMRS embodiments for purposes like tracking, channel estimation, CSI measurements and feedback, demodulation, etc., in similar ways.

The embodiments may be applied in various scenarios. In the case of subframe-level small cell on/off, if DRS is not configured or DRS periodicity is long, then eRS can be used for time synchronization, channel estimation, measurements, CSI feedback, and so on. At the first subframe when the cell is turning on, eRS can help UE acquire timing/AGC/etc. as soon as it can. Effectively eRS in this case can serve the role of a DRS but with flexibility (e.g., transmitted aperiodically). Then eDMRS can be used for demodulation/CSI feedback/etc. If DRS is configured with sufficiently short periodicity and timing is not an issue, then eDMRS can be configured. In the case of LTE operating on unlicensed band, generally there cannot be any periodic DRS, and the eRS can be sent aperiodically on-demand, which may contain PSS-like signals for timing and additional RS for channel estimation, measurements, CSI feedback, etc. The eRS may also contain eDMRS which may be used to replace legacy DMRS. In addition, in the case of LTE operating on high-frequency band, the eRS may contain PSS-like signals for timing synchronization, cell-specific/UE-specific eDMRS for precoding and receiving combining training and feedback, and cell-specific/UE-specific eDMRS for data demodulation.

Figure 15:
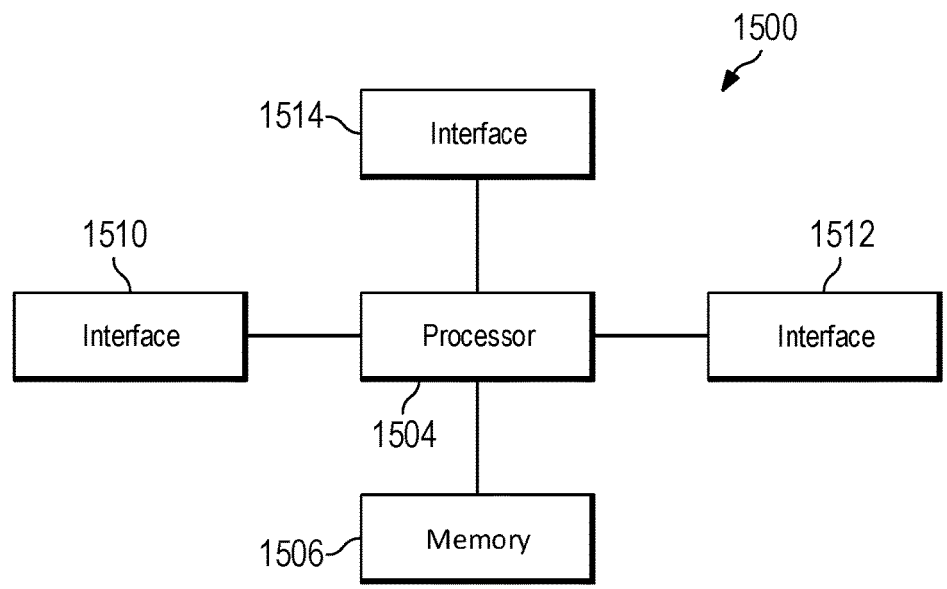
FIG. 15 illustrates a computing platform that may be used for implementing, for example, the devices and methods described herein, in accordance with an embodiment.

FIG. 15 is a block diagram of a processing system 1500 that may be used for implementing the devices and methods disclosed herein. System 1500 may be used in cell sites such as sites 105 or 121 in FIG. 1B, or may be located in support functions (not shown). Specific devices may utilize all of the components shown, or only a subset of the components and levels of integration may vary from device to device. Furthermore, a device may contain multiple instances of a component, such as multiple processing units, processors, memories, transmitters, receivers, etc. The processing system may comprise a processing unit equipped with one or more input/output devices 1502, such as a speaker, microphone, mouse, touchscreen, keypad, keyboard, printer, display, and the like. The processing unit may include a central processing unit (CPU) 1504, memory 1506, a mass storage device 1508, a video adapter 1510, and an I/O interface 1512 connected to a bus 1514.

The bus 1514 may be one or more of any type of several bus architectures including a memory bus or memory controller, a peripheral bus, video bus, or the like. The CPU 1504 may comprise any type of electronic data processor. The memory 1506 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 1506 may include ROM for use at boot-up, and DRAM for program and data storage for use while executing programs.

The mass storage device 1508 may comprise any type of non-transitory storage device configured to store data, programs, and other information and to make the data, programs, and other information accessible via the bus. The mass storage device 1508 may comprise, for example, one or more of a solid state drive, hard disk drive, a magnetic disk drive, an optical disk drive, or the like.

The video adapter 1510 and the I/O interface 1512 provide interfaces to couple external input and output devices to the processing unit. As illustrated, examples of input and output devices include the display coupled to the video adapter 1510 and the mouse/keyboard/printer coupled to the I/O interface 1512. Other devices may be coupled to the processing system 1500, and additional or fewer interface devices may be utilized. For example, a serial interface such as Universal Serial Bus (USB) (not shown) may be used to provide an interface for a printer.

The processing system 1500 also includes one or more network interfaces 1516, which may comprise wired links, such as an Ethernet cable or the like, and/or wireless links to access nodes or different networks. The network interface 1516 allows the processing system 1500 to communicate with remote units via the networks. For example, the network interface 1516 may provide wireless communication via one or more transmitters/transmit antennas and one or more receivers/receive antennas. In an embodiment, the processing system 1500 is coupled to a local-area network or a wide-area network 1501 for data processing and communications with remote devices, such as other processing units, the Internet, remote storage facilities, or the like.

Figure 16:
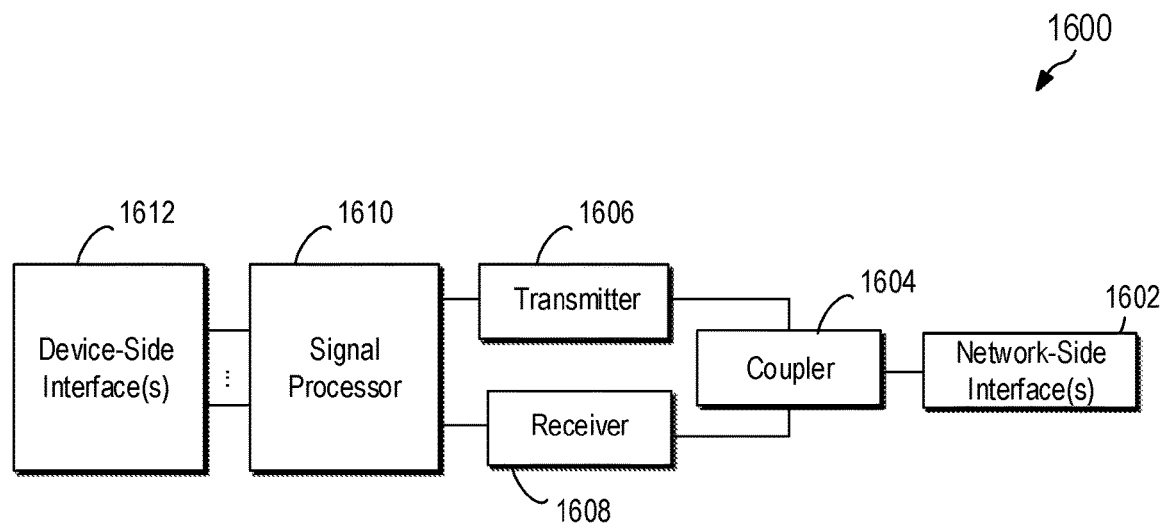
FIG. 16 illustrates a telecommunications system, in which one or more of the embodiments of the disclosure may be implemented.

FIG. 16 illustrates a telecommunications system in which one or more of the embodiments of the disclosure may be implemented. FIG. 16 is a block diagram of a transceiver 1600 adapted to transmit and receive signaling over a telecommunications network. Transceiver 1600 may be used in cell sites such as sites 105 or 121 in FIG. 1B. The transceiver 1600 may be installed in a host device and some or all of its components may be virtualized. As shown, the transceiver 1600 comprises at least one network-side interface 1602, a coupler 1604, a transmitter 1606, a receiver 1608, a signal processor 1610, and a device-side interface 1612. The network-side interface 1602 may include any component or collection of components adapted to transmit or receive signaling over a wireless or wireline telecommunications network. The coupler 1604 may include any component or collection of components adapted to facilitate bi-directional communication over the network-side interface 1602. The transmitter 1606 may include any component or collection of components (e.g., up-converter, power amplifier, etc.) adapted to convert a baseband or informational signal into a modulated carrier signal suitable for transmission over the network-side interface 1602. The receiver 1608 may include any component or collection of components (e.g., down-converter, low noise amplifier, etc.) adapted to convert a carrier signal received over the network-side interface 1602 into a baseband or informational signal. The signal processor 1610 may include any component or collection of components adapted to convert a baseband signal into a data signal suitable for communication over the device-side interface(s) 1612, or vice-versa. The device-side interface(s) 1612 may include any component or collection of components adapted to communicate data-signals between the signal processor 1610 and components within the host device (e.g., the processing system 1500, local area network (LAN) ports, etc.).

The transceiver 1600 in some examples receives a path request from a component or components of a network, such as a MPLS network for example. The transceiver 1600 in some examples receives a request for a path of a unicast or multicast label switching path (LSP). The transceiver 1600 generates and transfers a primary path and a secondary/local protection path for a plurality of nodes of the network and distributes the primary path and the secondary/local protection path to the plurality of nodes.

The transceiver 1600 may transmit and receive signaling over any type of communications medium. In some embodiments, the transceiver 1600 transmits and receives signaling over a wireless medium. For example, the transceiver 1600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1602 comprises one or more antenna/radiating elements. For example, the network-side interface 1602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for adaptive communication, the method comprising:
   receiving, by a user equipment (UE), an indicator from a first component carrier of a second component carrier;
   receiving, by the UE, from the second component carrier a first slot and a second slot after the first slot, the first and second slots each comprising a plurality of subcarriers in the frequency domain and a first symbol position at the beginning of the first and second slots in the time domain, wherein a reference signal is provided at the first symbol position of the first slot and at the first symbol position of the second slot, the reference signal provided at more of the subcarriers of the first slot than at the subcarriers of the second slot, wherein the reference signal comprises a plurality of precoded reference signals (RS), wherein at least one of the precoded RS is precoded for the second component carrier;
   determining, by the UE, at least one channel characteristic of a channel for the second component carrier based on the reference signals; and
   initiating, by the UE, a data link with the second component carrier.

2. The method of claim 1 wherein the reference signal comprises one or more of a demodulation reference signal (DMRS), channel status indicator reference signal (CSI-RS), primary synchronization signal (PSS), secondary synchronization signal (SSS), cell-specific reference signal (CRS) and/or discovery reference signal (DRS).

3. The method of claim 1 wherein the first slot further comprises additional reference signals at symbol positions other than the first symbol position.

4. The method of claim 1 wherein the first slot further comprises a plurality of blank resource elements in a last symbol position of the first slot.

5. The method of claim 1 wherein at least one of the precoded RS is precoded for automatic gain control (AGC).

6. The method of claim 1 wherein at least one of the precoded RS is precoded for demodulation of a data channel.

7. The method of claim 1 wherein at least one of the precoded RS is precoded for the UE.

8. The method of claim 1 wherein the precoded RS are indexed according to associated time-frequency resources and the UE receives a RS index associated with a physical downlink shared channel (PDSCH), and the UE uses the precoded RS associated with the RS index to demodulate the PDSCH, and wherein the precoded RS associated with the RS index may be specific to the second component carrier or the UE.

9. The method of claim 8 wherein the UE uses the precoded RS having a highest signal to interference plus noise ratio for CSI measurements and feedback, wherein the RS index associated with the precoded RS having a highest signal to interference plus noise ratio is reported.

10. The method of claim 1 wherein the first symbol position is located at the beginning of the first and second slots in the time domain, the reference signal is provided at the first symbol position of each of the subcarriers of the first slot, and the reference signal is not provided at the first symbol position of any of the subcarriers of the second slot.

11. The method of claim 1 wherein the reference signal of the first slot has a higher power than other subcarriers of the first slot.

12. A method for adaptive communication, the method comprising:
transmitting, by a base station, over a first component carrier to a user equipment (UE), an indicator of a second component carrier;
transmitting, by the base station, over the second component carrier to the UE, a slot comprising a plurality of subcarriers in the frequency domain and a first symbol position at the beginning of the slot in the time domain, wherein a reference signal is provided at the first symbol position of the slot in a majority of the subcarriers of the slot, wherein the reference signal comprises a plurality of precoded reference signals (RS), wherein at least one of the precoded RS is precoded for the second component carrier;
receiving, by the base station, over the second component carrier from the UE, a first transmission in accordance with at least one channel characteristic of a channel for the second component carrier; and
transmitting, by the base station, over the second component carrier to the UE, a second transmission.

13. The method of claim 12 wherein the first and second component carriers are controlled by the base station.

14. The method of claim 12 wherein the first and second component carriers are connected by a fast backhaul.

15. The method of claim 12 wherein the first symbol position of the slot in each of the subcarriers includes the reference signal.

16. The method of claim 12 wherein the reference signal comprises one or more of a demodulation reference signal (DMRS), channel status indicator reference signal (CSI-RS), primary synchronization signal (PSS), secondary synchronization signal (SSS), cell-specific reference signal (CRS)and/or discovery reference signal (DRS).

17. The method of claim 12 wherein the reference signal comprises a plurality of precoded DMRS.

18. The method of claim 17 wherein at least one of the precoded DMRS is precoded for automatic gain control (AGC).

19. The method of claim 17 wherein at least one of the precoded DMRS is precoded for demodulation of a data channel.

20. The method of claim 17 wherein at least one of the precoded DMRS is precoded for the UE.

21. The method of claim 17 wherein at least one of the precoded DMRS is precoded for the second component carrier.

22. The method of claim 12 wherein the reference signal has a higher power than other components of the slot.

23. A user equipment (UE) comprising:
a processor; and
a computer readable storage medium storing programming for execution by the processor, the programming including instructions to:
receive an indicator from a first component carrier of a second component carrier;
receive from the second component carrier a first slot and a second slot after the first slot, the first and second slots each comprising a plurality of subcarriers in the frequency domain and a first symbol position at the beginning of the first and second slots in the time domain, wherein a reference signal is provided at the first symbol position of the first slot and at the first symbol position of the second slot, the reference signal provided at more of the subcarriers of the first slot than at the subcarriers of the second slot, wherein the reference signal comprises a plurality of precoded reference signals (RS), wherein at least one of the precoded RS is precoded for the second component carrier;
determine at least one channel characteristic of a channel for the second component carrier based on the reference signals; and
initiate a data link with the second component carrier.

24. The UE of claim 23 wherein the reference signal comprises one or more of a demodulation reference signal (DMRS), channel status indicator reference signal (CSI-RS), primary synchronization signal (PSS), secondary synchronization signal (SSS), cell-specific reference signal (CRS)and/or discovery reference signal (DRS).

25. The UE of claim 23 wherein the first slot further comprises additional reference signals at symbol positions other than the first symbol position.

26. The UE of claim 23 wherein the first slot further comprises a plurality of blank resource elements in a last symbol position of the first slot.

27. The UE of claim 23 wherein the reference signal comprises a plurality of precoded DMRS.

28. The UE of claim 27 wherein at least one of the precoded DMRS is precoded for automatic gain control (AGC).

29. The UE of claim 27 wherein at least one of the precoded DMRS is precoded for demodulation of a data channel.

30. The UE of claim 27 wherein at least one of the precoded DMRS is precoded for the UE.

31. The UE of claim 27 wherein at least one of the precoded DMRS is precoded for the second component carrier.

32. The UE of claim 23 wherein the first symbol position is located at the beginning of the first and second slots in the time domain, the reference signal is provided at the first symbol position of each of the subcarriers of the first slot, and the reference signal is not provided at the first symbol position of any of the subcarriers of the second slot.

33. The UE of claim 23 wherein the reference signal of the first slot has a higher power than other subcarriers of the first slot.

* * * * *